US012750875B2

(12) United States Patent
Zeng et al.

(10) Patent No.: US 12,750,875 B2
(45) Date of Patent: Sep. 29, 2026

(54) TRIPLE BEAT AVOIDANCE FOR CONTIGUOUS AND NON-CONTIGUOUS INTRA-BAND CARRIER AGGREGATIONS

(71) Applicant: pSemi Corporation, San Diego, CA (US)

(72) Inventors: Yonghuang Zeng, San Diego, CA (US); Pushp Trikha, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 434 days.

(21) Appl. No.: 18/477,462

(22) Filed: Sep. 28, 2023

(65) Prior Publication Data

US 2024/0129948 A1 Apr. 18, 2024

Related U.S. Application Data

(60) Provisional application No. 63/377,970, filed on Sep. 30, 2022.

(51) Int. Cl.
*H04W 4/00* (2018.01)
*H04L 5/00* (2006.01)
*H04W 72/541* (2023.01)

(52) U.S. Cl.
CPC ......... *H04W 72/541* (2023.01); *H04L 5/0007* (2013.01)

(58) Field of Classification Search
CPC ............ H04W 72/541; H04W 72/0453; H04L 5/0007; H04L 5/003; H04L 5/0073; H04L 5/14; H04L 5/001
See application file for complete search history.

(56) References Cited

U.S. PATENT DOCUMENTS 9,374,125 B1 6/2016 Roberts
10,038,414 B2 7/2018 Ranta et al.
(Continued)

FOREIGN PATENT DOCUMENTS

CA 2809585 A1 12/2013
CA 2967281 C * 1/2023 ........... H04L 1/1671
EP 3018857 A1 5/2016

*Primary Examiner* — Thai Dinh Hoang
(74) *Attorney, Agent, or Firm* — Haynes and Boone, LLP

(57) ABSTRACT

Systems and methods for detecting and mitigating triple beat interference include implementing an intra-band carrier aggregation communications protocol across a plurality of frequency bands, identifying an intra-band carrier aggregation channel allocation for a client device, detecting triple beat interference in the plurality of frequency bands by the intra-band carrier aggregation channel allocation, and mitigating the detected triple beat interference through reallocation of the intra-band carrier aggregation channels to the client device. Mitigating may include adjusting one or more allocation parameters to derive an updated intra-band carrier aggregation channel allocation, detecting triple beat interference by the updated intra-band and carrier aggregation channel allocation, and repeating the adjusting step if triple beat interference is detected. Adjusting parameters may include incrementally increasing and/or decreasing an allocation parameter value, and repeating the adjusting step if the triple beat interference is detected or until the allocation parameter value is outside of an available range.

20 Claims, 14 Drawing Sheets

(56) References Cited

U.S. PATENT DOCUMENTS

| | | | |
|---|---|---|---|
| 10,326,484 | B1 | 6/2019 | Ayranci et al. |
| 10,771,025 | B1 | 9/2020 | Ayranci et al. |
| 11,251,765 | B2 | 2/2022 | Ayranci et al. |
| 11,336,243 | B2 | 5/2022 | Ayranci et al. |
| 11,563,455 | B1 | 1/2023 | Bacon |
| 2016/0302209 | A1 | 10/2016 | Behravan et al. |
| 2021/0314009 | A1 | 10/2021 | Sjoland et al. |
| 2023/0026906 | A1 | 1/2023 | Hor et al. |

* cited by examiner

100

500

550

600

650

TRIPLE BEAT AVOIDANCE FOR CONTIGUOUS AND NON-CONTIGUOUS INTRA-BAND CARRIER AGGREGATIONS

CROSS-REFERENCE TO RELATED APPLICATIONS

This application claims the benefit of and priority to U.S. Provisional Patent Application No. 63/377,970, filed on Sep. 30, 2022, entitled "TRIPLE BEAT AVOIDANCE FOR CONTIGUOUS & NON-CONTIGUOUS INTRA-BAND CARRIER AGGREGATIONS," which is hereby incorporated by reference in its entirety.

BACKGROUND

The present disclosure relates generally to communications systems, and more particularly for example, to systems and methods for mitigating and/or avoiding triple beat interference in multichannel communications system.

Modern communication systems, including cellular networks, satellite communications, broadcasting systems, and the like, generally operate through the transmission and reception of signals across multiple frequency bands. In many systems, nonlinearities are introduced into the signal processing chain, which can result in the generation of intermodulation products, such as triple beats.

Triple beats arise when nonlinearities within the system cause multiple signals to mix, generating new frequencies that can interfere with a bandwidth of another communication signal. Triple beats can degrade communication quality, disrupt data transmission, and otherwise interfere with the proper functioning of a communication system. Existing techniques for mitigating triple beat interference, such as adjusting power levels or applying linearization techniques, can be complex, resource-intensive, and in many instances fail to satisfactorily mitigate the risk of triple beat occurrence. As communication systems become more complex and the demand for higher data rates in existing channels increases, there is an increasing need for more robust and efficient solutions to address triple beat interference.

SUMMARY

The present disclosure introduces improved systems and methods for triple beat mitigation and/or avoidance in communications systems that enhance communication system performance and reliability.

In various embodiments, a method includes implementing an intra-band carrier aggregation communications protocol across a plurality of frequency bands, identifying an intra-band carrier aggregation channel allocation for a client device, detecting triple beat interference in the plurality of frequency bands by the intra-band carrier aggregation channel allocation, and mitigating the detected triple beat interference through reallocation of the intra-band carrier aggregation channels to the client device.

In some embodiments, mitigating triple beat interference includes adjusting one or more allocation parameters to derive an updated intra-band carrier aggregation channel allocation, detecting whether triple beat interference is present in the plurality of frequency bands by the updated intra-band carrier aggregation channel allocation, and repeating the adjusting if the triple beat interference is detected. In some embodiments, adjusting parameters includes incrementally increasing and/or decreasing an allocation parameter value, and repeating the adjusting if the triple beat interference is detected until the allocation parameter value is outside of an available range.

Detecting triple beat interference may include determining whether the intra-band carrier aggregation channel allocation is susceptible to triple beat interference, calculating a triple beat condition for the intra-band carrier aggregation channel allocation, determining whether the triple beat condition overlaps a victim band in the plurality of frequency bands, and implementing mitigation of the triple beat interference if the triple beat condition is detected to overlap the victim band.

The intra-band carrier aggregation channel allocation may include a downlink configuration and an uplink configuration, and the step of determining whether the intra-band carrier aggregation channel allocation is susceptible to triple beat interference may include assessing whether the downlink configuration includes at least two inter-band carrier aggregation or dual connectivity band combinations, and assessing whether the uplink configuration comprises an uplink inter-band combination with three uplink component carriers within two uplink clusters.

In various embodiments, a system may be configured to perform all or part of the method for detecting and/or mitigating triple beat interference. In some embodiments, the system may include communications components configured to implement an intra-band carrier aggregation communications protocol across a plurality of frequency bands, and a logic device configured to perform various steps of the method. The system may include a host system (e.g., a wireless communications network including one or more base stations) and one or more client devices (e.g., user equipment, wireless mobile device) and may implement wired and/or or wireless communications.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
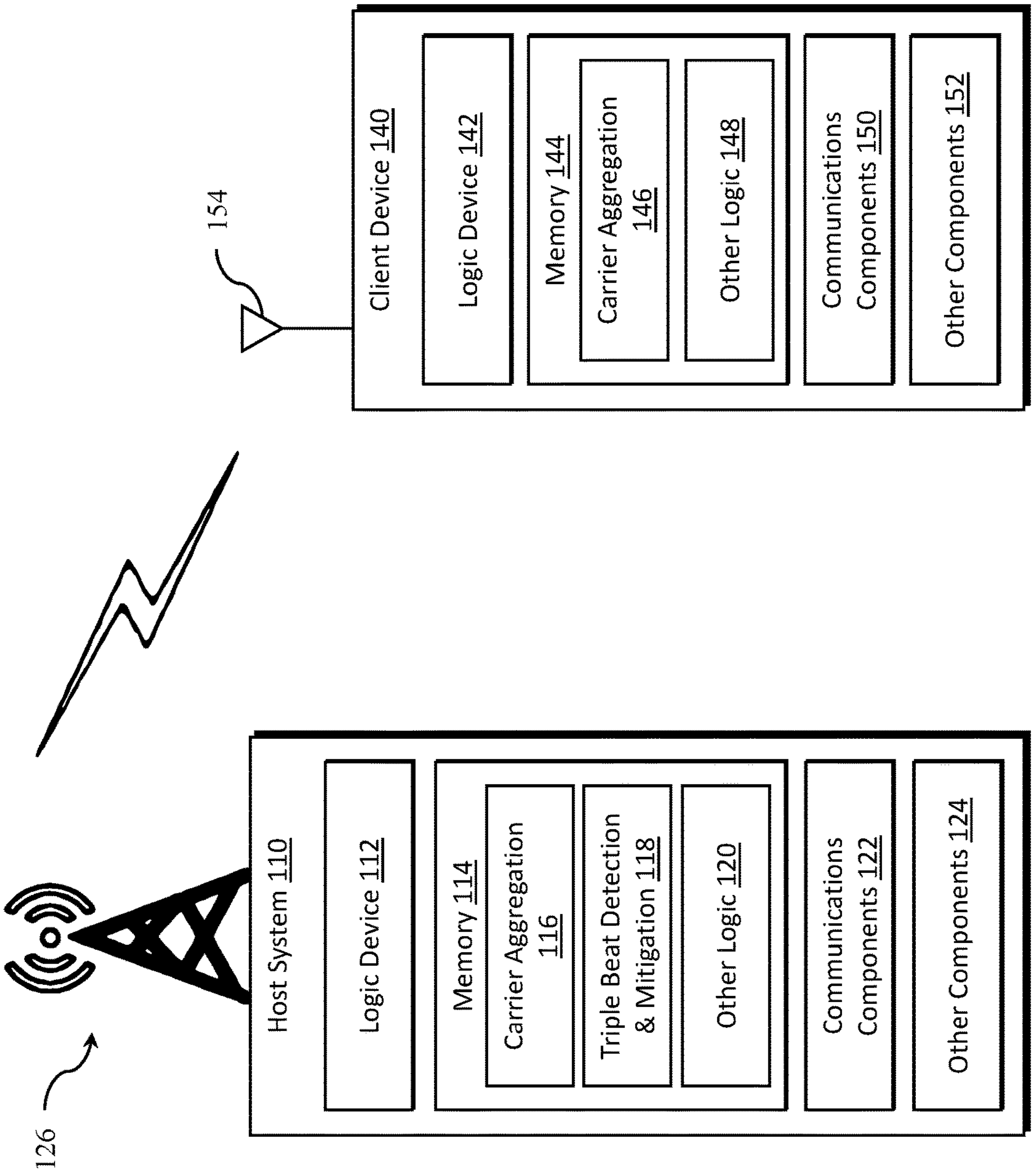
FIG. 1 illustrates an example communications system, in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The present disclosure relates to systems and methods for mitigating and/or avoiding triple beat interference. In some embodiments, the communications system may employ intra-band contiguous carrier aggregation and one or more systems and methods may include mitigating triple beat effects within victim bands with positive or negative duplex offsets. In some embodiments, one or more victim bands may be identified by analyzing the frequency components and intermodulation products within the victim bands, thereby allowing for the determination of potential triple beat frequencies. The systems and methods disclosed herein effectively mitigate and/or avoid the occurrence of triple beat interference, allowing further control over the integrity and quality of communication signals.

In some embodiments, the systems and methods disclosed herein include user equipment and/or base station(s) configured to implement the triple beat mitigation and/or avoidance methods described herein. The user equipment and/or base station may be configured to apply one or more processes or equations to victim bands with either positive or negative duplex offsets, thereby preventing or mitigating the occurrence of triple beat interference. In implementing the disclosed triple beat avoidance systems and methods disclosed herein, the user equipment and/or base station can operate to provide reliable and efficient communication within intra-band contiguous uplink carrier aggregation, intra-band non-contiguous uplink carrier aggregation, and other carrier aggregation scenarios that may generate triple beat interference.

One or more methods in accordance embodiments of the present disclosure may include gathering relevant band frequency information from the communication system, which is used to provide context for subsequent calculations and actions. Next, the method may calculate a potential triple beat frequency. In some embodiments, this calculation includes analyzing the characteristics of the gathered band frequency information to identify potential triple beat frequencies. The methods may further include using one or more processes selected in accordance with the characteristics of the communication system, such as whether the system implements intra-band contiguous uplink carrier aggregation, intra-band non-contiguous uplink carrier aggregation, or other carrier aggregation scenario.

The methods may include one or more processes for avoiding triple beat interference, which may include identifying a victim frequency and activating triple beat interference avoidance processes. In some embodiments, the avoidance process is configured to dynamically adjust communication parameters and/or take appropriate actions to circumvent the occurrence of triple beat interference. In some methods, the system is configured to test potential victim frequencies and trigger a "hit" indicative of the potential presence of triple beat frequencies within the communication system. By actively avoiding the identified frequencies or taking other corrective measures, the methods disclosed herein can be used to mitigate and/or avoid adverse effects of triple beat interference in the operation of the communications system.

Embodiments of the present disclosure may be implemented in a wide variety of wireless and/or wired communications systems and environments where triple beat interference is present. For example, a communications system may include wireless systems (which may include base stations, relay stations, hand-held transceivers, and other equipment) that use various technologies and protocols that implement carrier aggregation, such as 4G Long Term Evolution ("4G LTE"), 5G, Wi-Fi 6E (802.11ax), as well as other communications standards and protocols. A wireless communications system may further include radio frequency (RF) circuits and systems for performing a range of functions, including (but not limited to) impedance matching circuits, RF power amplifiers, RF low-noise amplifiers (LNAs), phase shifters, attenuators, antenna beam-steering systems, charge pump devices, RF switches, and other components.

In some embodiments, triple beat detection and mitigation is implemented by a communications system operator to mitigate or prevent interference caused by nonlinearities in the communication system's frequency allocations. These nonlinearities can lead to unwanted signal interactions, creating additional frequencies that can interfere with communication signals. Generally, triple beat interference occurs when three signals mix in a manner that generates a frequency that falls within the communication system's bandwidth. Triple beat interference can generate signals at frequencies that are not present in the transmitted signal, reducing performance and/or disrupting intended communications from a client device.

Triple beat interference generally arises in scenarios where multiple communication signals are transmitted simultaneously, such as in cellular networks, broadcasting systems, satellite communication, and other communications systems. The presence of strong signals can generate intermodulation products (IMDs) like triple beats and can desensitize the receiver to weaker signals, thereby reducing the receiver's ability to detect and process weaker signals. This problem may be referred to as "desense." In some embodiments, triple beat detection and avoidance systems and methods are designed to mitigate desense and maintain the receiver's sensitivity to weaker signals and overall performance level.

FIG. 1 illustrates an example of a communications system 100 including one or more host systems 110 and one or more client devices 140. The client device 140 may be configured to communicate with one or more host systems 110 or other devices (e.g., satellites, other wireless devices, etc.) using one or more of telecommunication protocols. The client device 140 may be equipped with multiple antennas (such as antenna 154), externally and/or internally, for operation on different frequencies and/or to provide diversity against deleterious path effects such as fading and multipath interference. The client device 140 may be implemented as mobile device, a vehicle system, a smart phone, a wireless-enabled computer or tablet, or another wireless communication unit or device. The client device 140 may be referred to as a mobile station, user equipment, an access terminal, or some other terminology.

The host system 110 is configured to facilitate over-the-air wireless communication for the client device 140 and/or other wireless devices within its coverage area. The hardware components for realizing the various embodiments including logical blocks, modules, and circuits described within the context of the disclosed embodiments can be implemented or executed using a wide range of technology. In the illustrated embodiment, the host system 110 is implemented as a base station 126 and includes a logic device 112, a memory 114, communications components 122 (e.g., hardware and/or software components facilitating transmission and reception of wireless signals), and other components 124 as appropriate for the operation of the host system 110.

The logic device 112 may be implemented as a general-purpose processor, a digital signal processor (DSP), an application-specific integrated circuit (ASIC), a microcontroller, a programmable logic device (PLD), a field-programmable gate array (FPGA), or other programmable logic device(s). Additionally, other components 124 may include discrete gate or transistor logic, separate hardware elements, or any combination thereof, which may be configured to perform the functions detailed herein and/or other functions of the as desired for the implementation. The logic device 112 and other components may be configured through hardwiring, software execution, or a combination of both to perform the operations discussed within this disclosure.

In various embodiments, the memory 114 may include one or more memory devices designed to retain data, such as software instructions for execution by the logic device 112. The memory 114 may include volatile and non-volatile memories, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drives, or other memory types.

As previously mentioned, the logic device 112 can execute software instructions residing in the memory 114, thereby accomplishing method steps and operations, such as described herein with respect to FIGS. 2-14. In various embodiments, host system 110 logic may be integrated in software and/or hardware as part of the logic device 112, memory 114, and/or other components 124. In some embodiments, specific circuitry may perform some blocks or methods for some functionalities.

In the illustrated embodiment, the memory 114 may store software logic for implementing carrier aggregation 116 in accordance with one or more communications protocols (e.g., 5G, 4G LTE, or other protocols that implement carrier aggregation). In various embodiments, carrier aggregation 116 may include logic combining multiple frequency bands or carriers to increase data rates and overall network capacity of the system 100. The host system 110, through carrier aggregation 116, manages the allocation of different channels to different users or devices, such as client device 140, based on their data requirements and system conditions. In various embodiments, carrier aggregation 116 may include assigning communications channels (e.g., determining which frequency bands will be combined to form an aggregated channel for the client device 140), allocating resources to each band in the aggregated channel to facilitate efficient data transmission, coordinating communication between the host system 110 and the client device 140, and handling handover of carrier aggregation communications to another base station when the wireless device moves between base station coverage areas. The memory 114 may further store triple beat detection and mitigation logic 118, such as described in the present disclosure with respect to FIGS. 2-14, and other logic for operation of the host system 110.

In various embodiments, the client device 140 may include a logic device 142, a memory 144, communications components 150, and other components 152. The logic device 142 may be implemented as a general-purpose processor, a digital signal processor (DSP), an application-specific integrated circuit (ASIC), a microcontroller, a programmable logic device (PLD), a field-programmable gate array (FPGA), or other programmable logic device(s). Additionally, other components 152 may include discrete gate or transistor logic, separate hardware elements, or any combination thereof, which may be configured to perform the functions detailed herein or other functions as desired to the implementation of the client device 140. The logic device 142 and other components may be configured through hardwiring, software execution, or a combination of both to perform the operations discussed within this patent embodiment.

In various embodiments, the memory 144 may include one or more memory devices designed to retain data, such as software instructions for execution by the logic device 142. The memory 144 may include volatile and non-volatile memories, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drives, or other memory types.

As previously mentioned, the logic device 142 can execute software instructions residing n the memory 144, thereby accomplishing method steps and operations, such as described herein. In various embodiments, client device 140 logic may be integrated in software and/or hardware as part of the logic device 142, memory 144, and/or other components 152. In some embodiments, specific circuitry may perform some blocks or methods for some functionalities.

In the illustrated embodiment, the memory 144 may store software logic for implementing carrier aggregation 146 in accordance with one or more communications protocols (e.g., 5G, 4G LTE, or other protocols that implement carrier aggregation) implemented by the host system 110. In various embodiments, the client device 140 is configured with hardware and software to transmit and receive data using carrier aggregation, which may include coordination and communication with the carrier aggregation 116 of the host system 110.

The memory 144 may further store other logic 148 for operating the client device 140, such as a device operating system, user applications, and other logic. The communications components 150 may be configured to facilitate communications between the client device 140 and the host system 110. The other components 152 may include other hardware and software in the implementation of the wireless device, such as user interface components, a display screen, one or more audio input/output devices, a battery, or other components.

It will be appreciated that the example communications system of FIG. 1 is one potential implementation and that the present disclosure is applicable to other systems and devices where triple beat interference is present. In some embodiments, the communications system may include wired communications, satellite communications, or other wireless communications protocols. In some embodiments, the host system and/or client device may be wholly or partially implemented in customer premises equipment (CPE), such as modems, routers, set-top boxes, Voice Over Internet Protocol devices, wired or wireless access points, security cameras, satellite dishes, and other devices.

Figures 2A, 2B:
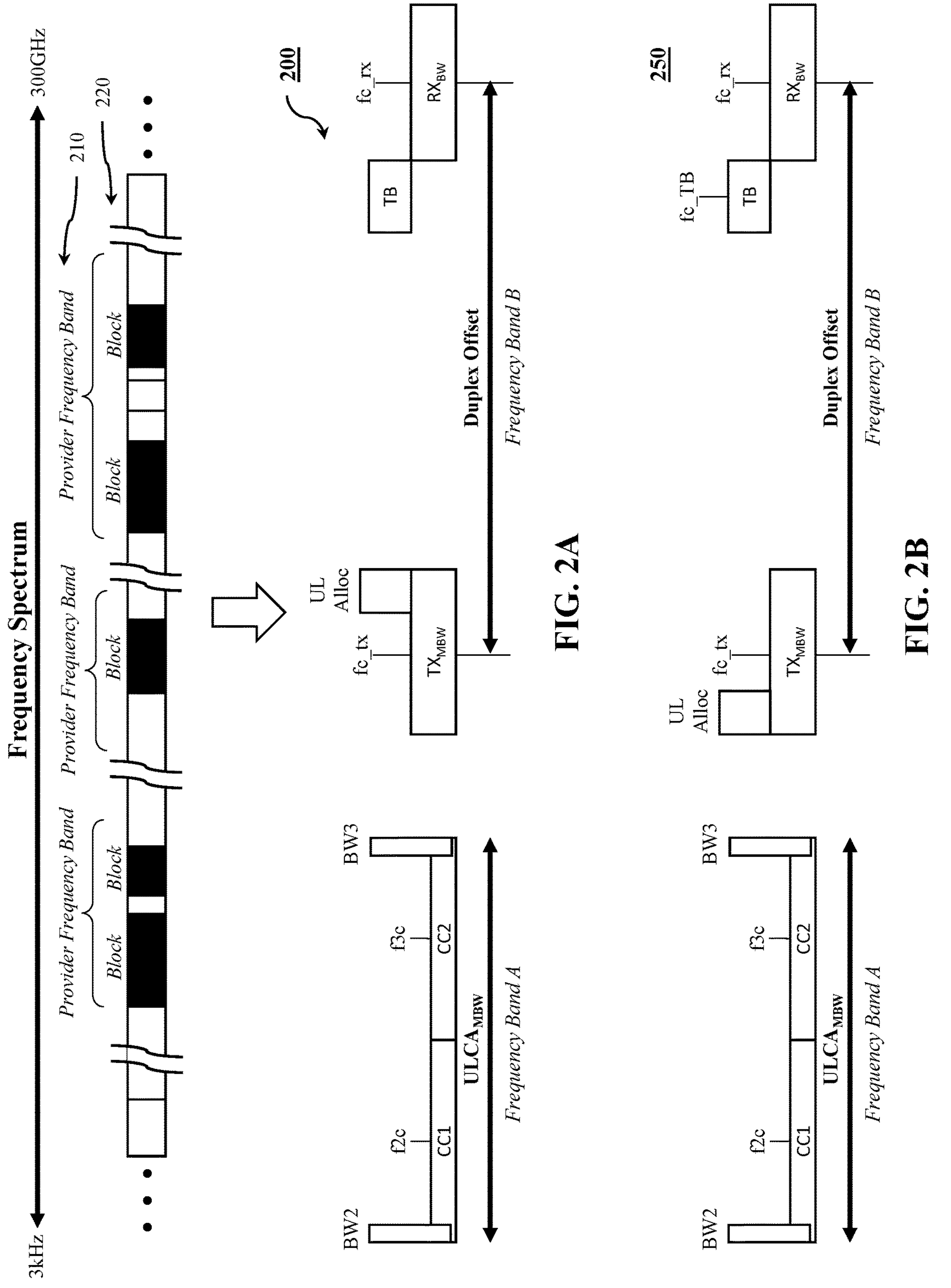
FIGS. 2A and 2B are charts illustrating an example of a triple beat hit condition for a contiguous carrier aggregation scenario for victim bands with positive duplex offsets and where the triple beat condition hits a low frequency edge of the victim band, in accordance with one or more embodiments of the present disclosure.

Various systems and methods for detecting triple beat conditions will now be described in further detail, in accordance with various embodiments. FIG. 2A is a chart 200 illustrating an example approach for triple beat detection in an intra-band contiguous uplink carrier aggregation scenario for victim bands with positive duplex offsets, in accordance with one or more embodiments. In the illustrated scenario, there is no gap between carrier bands, and the victim carrier band is transmitting at a high frequency edge, hitting the low frequency edge of the victim band.

In operation, a wireless communications provider and/or operator of a communications system may be limited to operating within authorized frequency ranges. For example, a cellular provider may be allocated a plurality of specific frequency bands 210 by a regulatory authority (e.g., the Federal Communications Commission (FCC) for operation in the United States, and other regulatory authorities in other jurisdictions). The different frequency bands may offer varying capabilities in terms of data capacity, coverage area, and other characteristics. Within a frequency band, the cellular provided may also be allocated one or more blocks 220 of frequencies within the larger frequency band. Each block 220 allocated to the provider may also be used for different types of communication, such as downlink traffic, uplink traffic, voice communication, control signals, and/or other types of communication. Cellular technologies such as 4G LTE and 5G may be allocated to a wireless provider in this manner.

An allocation of channels (as depicted in chart 200) within the provider's authorized frequency bands 210 may span a plurality of the provider's frequency bands 210 and blocks 220. In the illustrated embodiment, the provider's communication system (e.g., a host system 110 and/or base station 126 of FIG. 1) may allocate channels from a Frequency Band A and a separate Frequency Band B. The Frequency Bands A and B may comprise any of the plurality of provider frequency bands 210, and in various environments Frequency Band A may have a frequency range that is higher or lower than Frequency Band B.

A process for detecting triple beat interference in the illustrated allocation chart 200 will now be described. As illustrated, the center frequencies of the victim band Tx (transmit) and carrier frequencies CC1 & CC2, are represented as fc_tx, f2c & f3c, respectively, and their allocated bandwidths are represented as $TX_{allocBW}$, BW2 & BW3, respectively. It is recognized that for most common bands that have a downlink frequency that is greater than the uplink frequency, the following relationships for $1^{st}$ order triple beat (e.g., the α ($TX_2{}^2TX_1$) product) apply:

$$\text{fc\_TB} = f_{alloc\_c} + (f3c - f2c) = \text{fc\_tx} + TX_{MBW}/2 - TX_{allocBW}/2 + (f3c - f2c),$$

$$\text{BW\_TB} = TX_{allocBW} + BW2 + BW3$$

$$\begin{aligned}\text{f\_TB\_upperedge} &= \text{fc\_TB} + \text{BW\_TB}/2 \\ &= \text{fc\_tx} + TX_{MBW}/2 - TX_{allocBW}/2 + (f3c - f2c) + (TX_{allocBW} + BW2 + BW3)/2 \\ &= \text{fc\_tx} + TX_{MBW}/2 + (f3c + BW3/2) - (f2c - BW2/2)\end{aligned}$$

where $TX_{MBW}$ is the transmission (TX) maximum transmission bandwidth, $TX_{allocBW}$ is the TX allocated bandwidth, and $f_{alloc\_c}$ is the center frequency of the allocated TX signal.

In various embodiments, detection of the triple beat condition includes identifying when the triple beat starts to overlap the victim's receiving (Rx) band, e.g., when TB_upperedge is above the Rx_loweredge, which may be determined in accordance with the following detection criteria:

$$\text{f\_TB\_upperedge} > \text{fc\_rx} - RX_{BW}/2,$$

which may be rewritten as:

$$tx+TX_{MBW}/2+(f3c+BW3/2)-(f2c-BW2/2)>fc\_rx-RX_{BW}/2,$$

which may be re-arranged as:

$$fc\_rx+fc\_tx<(f3c+BW3/2)-(f2c-BW2/2)+TX_{MBW}/2+RX_{BW}/2.$$

In this example, Duplex_Offset=fc_rx−fc_tx and $ULCA_{MBW}=(f3c+BW3/2)-(f2c-BW2/2)$. Substituting them in and we obtain the following triple beat detection equation:

$$\text{Duplex Offset} < ULCA_{MBW}+TX_{MBW}/2+RX_{BW}/2 \tag{1}$$

Substituting $TX_{MBW}/2$ with $f_{alloc\_c}+TX_{allocBW}/2-fc\_tx$, yields the following equation:

$$\text{Duplex Offset}<(f_{alloc\_c}-fc\_tx)+TX_{allocBW}/2+ULCA_{MBW}+RX_{RW}/2 \tag{2}$$

FIG. 2B is a chart 300 illustrating an example approach for triple beat detection in an intra-band contiguous carrier aggregation scenario for victim bands with positive duplex offsets, in accordance with one or more embodiments. In this scenario, there is no gap between carrier bands, and the victim carrier band is transmitting at a low frequency edge, hitting the lower frequency edge of the victim band.

When the victim band's uplink frequency is allocated at the lower end, the following relationships for 1st order triple beat apply:

$$\begin{aligned} fc\_TB &= f_{alloc\_c} + (f3c - f2c) = fc\_tx - TX_{MBW}/2 + TX_{allocBW}/2 + (f3c - f2c) \\ BW\_TB &= TX_{allocBW} + BW2 + BW3 \\ f\_TB\_upperedge &= fc\_TB + BW\_TB/2 \\ &= fc\_tx - TX_{MBW}/2 + TX_{allocBW}/2 + (f3c - f2c) + (TX_{allocBW} + BW2 + BW3)/2 \\ &= fc\_tx - TX_{MBW}/2 + (f3c + BW3/2) - (f2c - BW2/2) + TX_{allocBW} \end{aligned}$$

where $TX_{MBW}$ is the victim's TX maximum transmission bandwidth, and $TX_{allocBW}$ is the TX allocated bandwidth, and $f_{alloc\_c}$ is the center frequency of the allocated TX signal.

In various embodiments, detection of the triple beat condition includes identifying when the triple beat starts to overlap the victim's Rx band, e.g., when TB_upperedge is above the Rx_loweredge, which may be determined in accordance with the following detection criteria:

$$f\_TB\_upperedge>fc\_rx-RX_{BW}/2,$$

which may be rewritten as:

$$fc\_tx-TX_{MBW}/2+(f3c+BW3/2)-(f2c-BW2/2)+TX_{allocBW}>fc\_rx-RX_{BW}/2,$$

which may be re-arranged as:

$$fc\_rx-fc\_tx<(f3c+BW3/2)-(f2c-BW2/2)-TX_{MBW}/2+RX_{BW}/2+TX_{allocBW}.$$

In this example, Duplex_Offset=fc_rx−fc_tx and $ULCA_{MBW}=(f3c+BW3/2)-(f2c-BW2/2)$. Substituting them in and we obtain the following triple beat detection equation:

$$\text{Duplex Offset}<ULCA_{MBW}-TX_{MBW}/2+RX_{BW}/2+TX_{allocBW} \tag{3}$$

Substituting $TX_{BW}/2$ with $fc\_tx-(f_{alloc\_c}-TX_{allocBW}/2))+RX_{BW}/2)$, gives equation:

$$\text{Duplex Offset}<ULCA_{MBW}-(fc\_tx-(f_{alloc\_c}-TX_{allocBW}/2))+RX_{BW}2+TX_{allocBW},$$ which after combining and re-arranging is the same as equation (2).

Figure 3A:
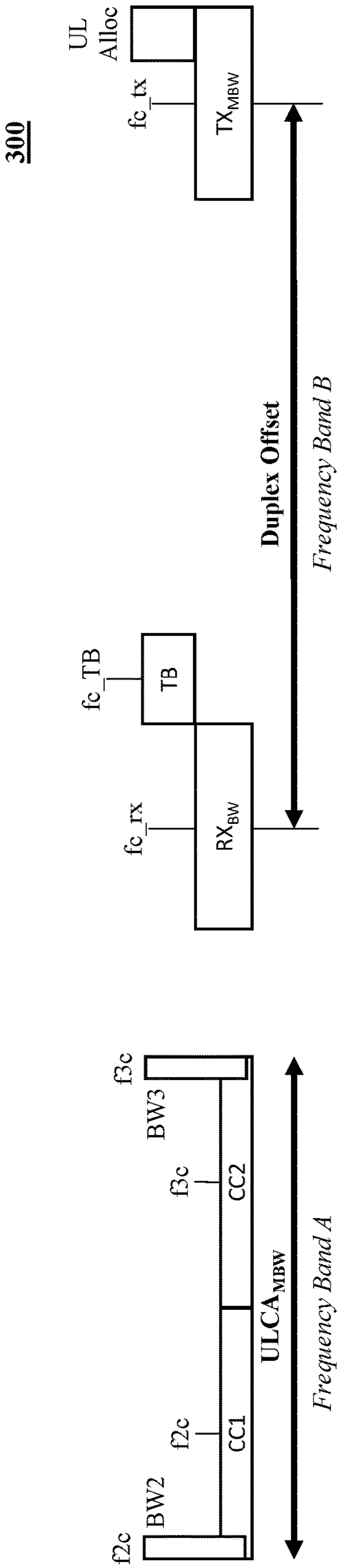
FIGS. 3A and 3B are charts illustrating an example of a triple beat hit condition for a contiguous carrier aggregation scenario for victim bands with negative duplex offsets and where the triple beat condition hits a high frequency edge of the victim band, in accordance with one or more embodiments of the present disclosure.

FIG. 3A is a chart 300 illustrating an example approach for triple beat detection in a contiguous uplink carrier aggregation scenario for victim bands with negative duplex offsets, in accordance with one or more embodiments. In this scenario, there is no gap between carrier bands, and the victim carrier band is transmitting at a high frequency edge, hitting the higher frequency edge of the victim band.

In the illustrated embodiment, the worst-case detection condition occurs when the victim ban's uplink frequency is allocated at the higher end, which may be determined in accordance with the following detection criteria:

$$\begin{aligned} fc\_TB &= f_{alloc\_c} + (f3c - f2c) = fc\_tx + TX_{MBW}/2 - TX_{allocBW}/2 - (f3c - f2c), \\ BW\_TB &= TX_{allocBW} + BW2 + BW3 \\ f\_TB\_loweredge &= fc\_TB - BW\_TB/2 \\ &= fc\_tx + TX_{MBW}/2 - TX_{allocBW}/2 - (f3c - f2c) - (TX_{allowBW} + BW2 + BW3)/2 \\ &= fc\_tx + TX_{MBW}/2 - (f3c + BW3/2) + (f2c - BW2/2) - TX_{allocBW} \end{aligned}$$

where $TX_{MBW}$ is the TX maximum transmission bandwidth, $TX_{allocBW}$ is the TX allocated bandwidth, and $f_{alloc\_c}$ is the center frequency of the allocated TX signal.

In various embodiments, detection of the triple beat condition includes identifying when the triple beat starts to overlap the victim's Rx band, e.g., when TB_loweredge is below the Rx_upperedge, which may be determined in accordance with the following detection criteria:

$$f\_TB\_loweredge<fc\_rx+RX_{BW}/2.$$

which may be rewritten as:

$$fc\_tx+TX_{MBW}/2-(f3c+BW3/2)+(f2c-BW2/2)-TX_{allocBW}<fc\_rx+RX_{BW}/2,$$

which may be re-arranged as:

$$-(fc\_rx-fc\_tx)<(f3c+BW3/2)-(f2c-BW2/2)-TX_{MBW}/2+RX_{RW}/2+TX_{allocBW}.$$

In this example, Duplex_Offset=fc_rx−fc_tx and $ULCA_{MBW}=(f3c+BW3/2)-(f2c-BW2/2)$. Substituting them in and we obtain the following triple beat detection equation:

$$-\text{Duplex Offset}<ULCA_{MBW}-TX_{MBW}/2+RX_{BW}/2+TX_{allocBW} \tag{4}$$

Substituting $TX_{MBW}/2$ with $f_{alloc\_c}+TX_{allocBW}/2)-fc\_tx$, gives equation:

−Duplex Offset$<ULCA_{MBW}-(f_{alloc_c}+TX_{allocBW}/2-fc_tx)+RX_{BW}/2+TX_{allocBW}$, which after combining and re-arranging yields the following equation, which is different than equation (2):

$$-\text{Duplex Offset}<-(f_{alloc\_c}-fc\_tx)+TX_{allocBW}2+ULCA_{MBW}+RX_{BW}/2 \tag{5}$$

Figure 3B:
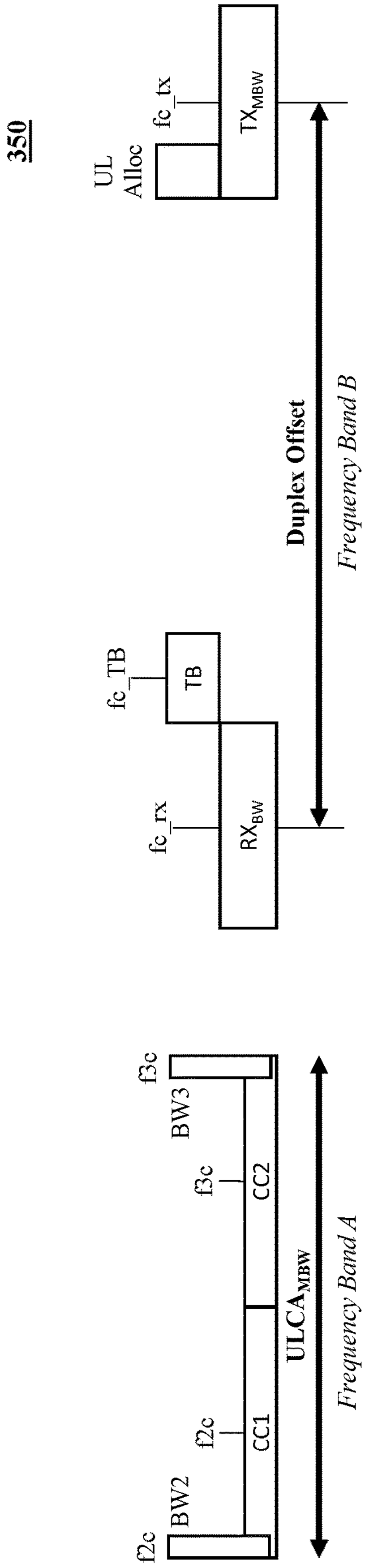

FIG. 3B is a chart 350 illustrating an example approach for triple beat detection in a contiguous uplink carrier aggregation scenario for victim bands with negative duplex offsets, in accordance with one or more embodiments. In this scenario, there is no gap between carrier bands, and the victim carrier band is transmitting at a low frequency edge, hitting the higher frequency edge of the victim band.

In the illustrated embodiment, the worst-case detection condition occurs when the victim ban's uplink frequency is allocated at the lower end, which may be determined in accordance with the following detection criteria:

$$fc\_TB = f_{alloc\_c} - (f3c - f2c) = fc\_tx - TX_{MBW}/2 + TX_{allocBW}/2 - (f3c - f2c)$$

$$BW\_TB = TX_{allocBW} + BW2 + BW3$$

$$\begin{aligned} f\_TB\_loweredge &= fc\_TB - BW\_TB/2 \\ &= fc\_tx - TX_{MBW}/2 + TX_{allocBW}/2 - (f3c - f2c) - (TX_{allowBW} + BW2 + BW3)/2 \\ &= fc\_tx - TX_{MBW}/2 - (f3c - BW3/2) + (f2c - BW2/2) \end{aligned}$$

where $TX_{MBW}$ is the TX maximum transmission bandwidth, $TX_{allocBW}$ the TX allocated bandwidth of the victim band, and $f_{alloc\_c}$ is the center frequency of the allocated TX signal.

In various embodiments, detection of the triple beat condition includes identifying when the triple beat starts to overlap the victim's Rx band, e.g., when TB_loweredge is below the Rx_upperedge, which may be determined in accordance with the following detection criteria:

$$f\_TB\_loweredge < fc\_rx + RX_{BW}/2,$$

which may be rewritten as:

$$(fc\_rx - TX_{MBW}/2 - (f3c + BW3/2) + (f2c - BW2/2) < fc\_rx + RX_{BW}/2,$$

which may be re-arranged as:

$$-(fc\_rx - fc\_tx) < (f3c + BW3/2) - (f2c - BW2/2) + TX_{MBW}/2 + RX_{BW}/2.$$

In this example, Duplex_Offset=fc_rx−fc_tx and $ULCA_{MBW}$=f3c+BW3/2)−(f2c−BW2/2). Substituting it in and we obtain the following triple beat detection equation for victim bands with negative duplex offsets:

$$-\text{Duplex Offset} < ULCA_{MBW} + TX_{MBW}/2 + RX_{BW}/2 \tag{6}$$

Substituting $TX_{MBW}/2$ with $fc\_tx - (f_{alloc\_c} - TX_{allocBW}/2) + RX_{BW}/2$, gives the equation:

$$-\text{Duplex Offset} < ULCA_{MBW} + fc\_tx - (f_{alloc\_c} - TX_{allocBW}/2) + RX_{BW}/2,$$ which after combing and re-arranging is the same as equation (5).

Figure 4A:
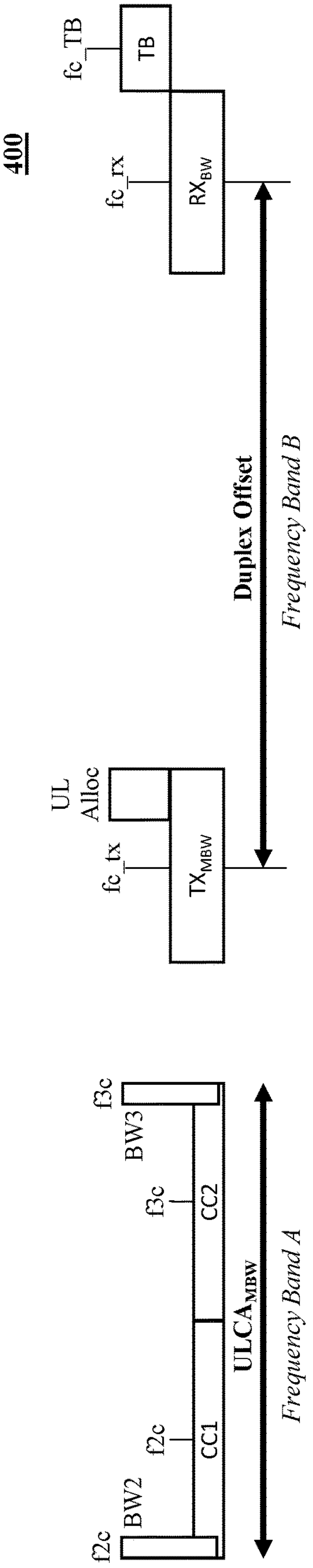
FIGS. 4A and 4B are charts illustrating an example of a triple beat hit condition for a contiguous carrier aggregation scenario for victim bands with positive duplex offsets and where the triple beat condition hits a high frequency edge of the victim band, in accordance with one or more embodiments of the present disclosure.

FIG. 4A is a chart 400 illustrating an example approach for triple beat detection in a contiguous uplink carrier aggregation scenario for victim bands with positive duplex offsets, in accordance with one or more embodiments. In this scenario, there is no gap between carrier bands, and the victim carrier band is transmitting at a high frequency edge, hitting the higher frequency edge of the victim band.

For those bands that have relatively large ULCA MBW and narrow Duplexer Offset, it's possible that triple beat may hit from the higher side of the victim's downlink band. This condition may be determined in accordance with the following detection criteria:

$$fc\_TB = f_{alloc\_c} + (f3c - f2c) = fc\_tx + TX_{MBW}/2 - TX_{allocBW}/2 + (f3c - f2c),$$

$$BW\_TB = TX_{allocBW} + BW2 + BW3$$

-continued $$\begin{aligned} f\_TB\_loweredge &= fc\_TB - BW\_TB/2 \\ &= fc\_tx + TX_{MBW}/2 - TX_{allocBW}/2 + (f3c - f2c) - (TX_{allowBW} + BW2 + BW3)/2 \\ &= fc\_tx + TX_{MBW}/2 + (f3c - BW3/2) - (f2c + BW2/2) - TX_{allocBW} \end{aligned}$$

where $TX_{MBW}$ is TX Maximum transmission bandwidth, $TX_{allocBW}$ is TX allocated BW, and $f_{alloc\_c}$ is center frequency of allocated TX signal.

In various embodiments, detection of the triple beat condition includes identifying when the triple beat starts to overlap the victim's Rx band, e.g., when TB_loweredge is below the Rx_higheredge, which may be determined in accordance with the following detection criteria:

$$f\_TB\_loweredge < fc\_rx + RX_{BW}/2,$$

which may be rewritten as:

$$fc\_tx + TX_{MBW}/2 + (f3c - BW3/2) - (f2c + BW2/2) - TX_{allocBW} < fc\_rx + RX_{BW}/2,$$

which may be re-arranged as:

$$fc\_rx - fc\_tx > (f3c - BW3/2) - (f2c + BW2/2) + TX_{MBW}/2 - RX_{BW}2 - TX_{allocBW}$$

In this example, Duplex_Offset=fc_rx−fc_tx and $ULCA_{MBW}$=(f3c+BW3/2)−(f2c−BW2/2). Substituting them in, we obtain the following triple beat detection equation:

$$\text{Duplex Offset} > ULCA_{MBW} + TX_{MBW}/2 - RX_{BW}/2 - TX_{allocBW} - BW - BW\mathbf{3}$$

Substituting $TX_{MBW}/2$ with $f_{alloc\_c} + TX_{allocBW}/2 - fc\_tx$, give the equation:

$$\text{Duplex Offset} > ULCA_{MBW} + (f_{alloc\_c} + TX_{allocBW}/2 - fc\_tx) - RX_{BW}/2 - TX_{allocBW} - BW\mathbf{2} - BW\mathbf{3}.$$

which after combing and re-arranging, provides the following new detection equation:

$$\text{Duplex Offset} > (f_{alloc\_c} - fc\_tx) - TX_{allocBW}/2 + ULCA_{MBW} - RX_{BW}/2 - BW\mathbf{2} - BW\mathbf{3} \tag{7}$$

Figure 4B:
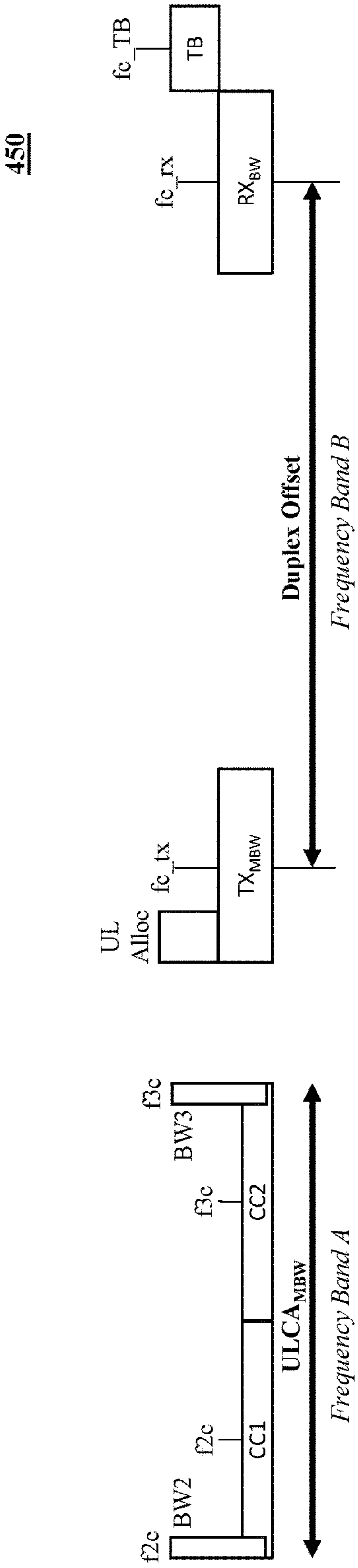

FIG. 4B is a chart 450 illustrating an example approach for triple beat detection in a contiguous uplink carrier aggregation scenario for victim bands with positive duplex offsets, in accordance with one or more embodiments. In this scenario, there is no gap between carrier bands, and the victim carrier band is transmitting at a low frequency edge, hitting the higher frequency edge of the victim band.

For those bands that have relatively large $ULCA_{MBW}$ and narrow Duplexer Offset, it's possible that triple beat may hit from the higher side of the victim's downlink band. This condition may be determined in accordance with the following detection criteria:

$$fc\_TB = f_{alloc\_c} + (f3c - f2c) = fc\_tx + TX_{MBW}/2 + TX_{allocBW}/2 + (f3c - f2c),$$

$$BW\_TB = TX_{allocBW} + BW2 + BW3$$

$$\begin{aligned} f\_TB\_loweredge &= fc\_TB - BW\_TB/2 \\ &= fc\_tx - TX_{MBW}/2 + TX_{allocBW}/2 + (f3c - f2c) - \end{aligned}$$

-continued $$(TX_{allowBW} + BW2 + BW3)/2$$

$$= \text{fc\_tx} - TX_{MBW}/2 + (f3c - BW3/2) - (f2c - BW2/2),$$

where $TX_{MBW}$ is TX maximum transmission bandwidth, $TX_{allocBW}$ is TX allocated bandwidth, and $f_{alloc\_c}$ is the center frequency of allocated TX signal.

In various embodiments, detection of the triple beat condition includes identifying when the triple beat starts to overlap the victim's Rx band, e.g., when TB_loweredge is below the Rx_upperedge, which may be determined in accordance with the following detection criteria:

$$\text{f\_TB\_loweredge} < \text{fc\_rx} + RX_{BW}/2,$$

which may be rewritten as:

$$\text{fc\_tx} - TX_{MBW}/2 + (f3c - BW3/2) - (f2c + BW2/2) < \text{fc\_rx} + RX_{BW}/2,$$

which may be re-arranged as:

$$\text{fc\_rx} - \text{fc\_tx} > (f3c - BW3/2) - (f2c + BW2/2) - TX_{MBW}/2 - RX_{BW}/2$$

In this example, Duplex_Offset=fc_rx−fc_tx and $ULCA_{MBW}$=(f3c+BW3/2)−(f2c−BW2/2). Substituting them in, we obtain the following triple beat detection equation:

$$\text{Duplex Offset} > ULCA_{MBW} - TX_{MBW}/2 - RX_{BW}/2 - BW2 - BW3.$$

Substituting $TX_{MBW}/2$ with fc_tx−($f_{alloc\_c}$−$TX_{allocBW}$/2), gives the equation:

$$\text{Duplex Offset} > ULCA_{MBW} - (\text{fc\_tx} - (f_{alloc\_c} + TX_{allocBW}/2)) - RX_{BW}/2 = BW2 - BW3,$$

which after combing and re-arranging is the same as equation (7).

Figure 5A:
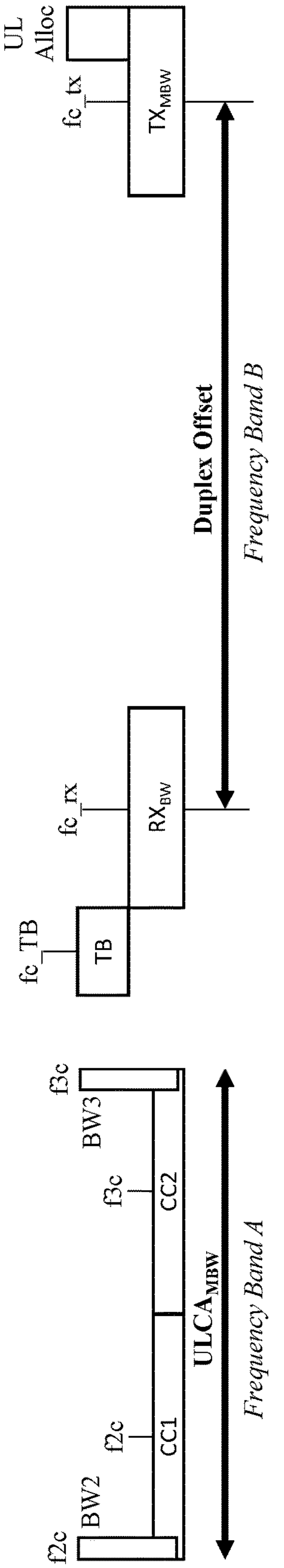
FIGS. 5A and 5B are charts illustrating examples of a triple beat hit condition for a contiguous carrier aggregation scenario for victim bands with negative duplex offsets and where the triple beat condition hits a low frequency edge of the victim band, in accordance with one or more embodiments of the present disclosure.

FIG. 5A is a chart 500 illustrating an example approach for triple beat detection in a contiguous uplink carrier aggregation scenario for victim bands with negative duplex offsets, in accordance with one or more embodiments. In this scenario, there is no gap between carrier bands, and the victim carrier band is transmitting at a high frequency edge, hitting the lower frequency edge of the victim band.

For those bands that have relatively large ULCAm B w and narrow Duplexer Offset, it's possible that triple beat may hit from the lower side of the victim's downlink band. This condition may be determined in accordance with the following detection criteria:

$$\text{fc\_TB} = f_{alloc\_c} - (f3c - f2c) = \text{fc\_tx} + TX_{MBW}/2 - TX_{allocBW}/2 - (f3c - f2c),$$

$$\text{BW\_TB} = TX_{allocBW} + BW2 + BW3$$

$$\text{f\_TB\_loweredge} = \text{fc\_TB} + \text{BW\_TB}/2 = \text{fc\_tx} + TX_{MBW}/2 - TX_{allocBW}/2 - (f3c - f2c) + (TX_{allowBW} + BW2 + BW3)/2 = \text{fc\_tx} + TX_{MBW}/2 - (f3c - BW3/2) + (f2c - BW2/2)$$

where $TX_{MBW}$ is the victim band's TX maximum transmission bandwidth, $TX_{allocBW}$ is TX allocated bandwidth, and $f_{alloc\_c}$ is the center frequency of the allocated TX signal.

In various embodiments, detection of the triple beat condition includes identifying when the triple beat starts to overlap the victim's Rx band, e.g., when TB upperedge is above the Rx_loweredge, which may be determined in accordance with the following detection criteria:

$$\text{f\_TB\_upperedge} > \text{fc\_rx} - RX_{BW}/2,$$

which may be rewritten as:

$$\text{fc\_tx} + TX_{MBW}/2 - (f3c - BW3/2) + (f2c + BW2/2) > \text{fc\_rx} - RX_{BW}/2,$$

which may be re-arranged as:

$$-(\text{fc\_rx} - \text{fc\_tx}) > (f3c - BW3/2) - (f2c + BW2/2) - TX_{MBW}/2 - RX_{BW}/2$$

In this example, Duplex_Offset=fc_rx−fc_tx and $ULCA_{MBW}$=(f3c+BW3/2)−(f2c−BW2/2). Substituting them in, we obtain the following triple beat detection equation:

$$-\text{Duplex\_Offset} > ULCA_{MBW} - TX_{MBW}/2 - RX_{BW}/2 - BW2 - BW3$$

Substituting $TX_{MBW}/2$ with $f_{alloc\_c}$+$TX_{allocBW}$/2−fc_tx, gives the equation:

$$-\text{Duplex\_Offset} > ULCA_{MBW} - (f_{alloc\_c} + TX_{allocBW}/2 - \text{fc\_tx}) - RX_{BW}/2 - BW2 - BW3,$$

which after combing and re-arranging, provides the following new detection equation:

$$-\text{Duplex\_Offset} > ULCA_{MBW} - (f_{alloc\_c} + TX_{allocBW}/2 - \text{fc\_tx}) - RX_{BW}/2 - BW2 - BW3 \quad (8)$$

Figure 5B:
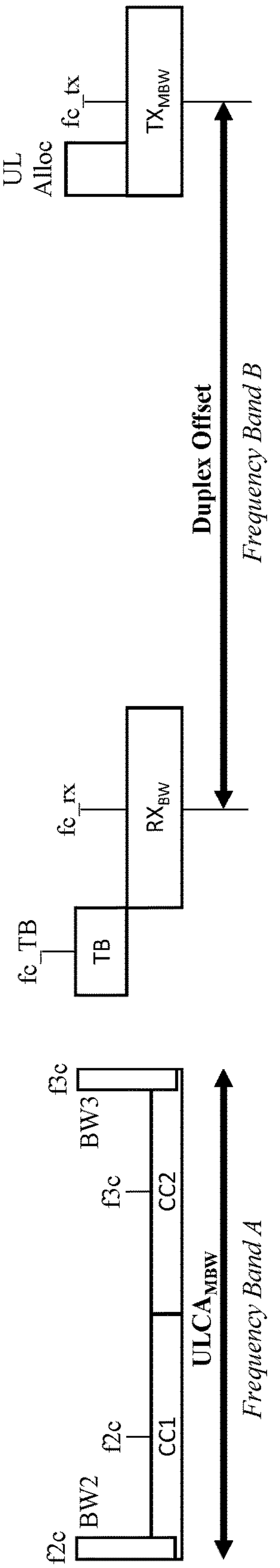

FIG. 5B is a chart 550 illustrating an example approach for triple beat detection in a contiguous uplink carrier aggregation scenario for victim bands with negative duplex offsets, in accordance with one or more embodiments. In this scenario, there is no gap between carrier bands, and the victim carrier band is transmitting at a low frequency edge, hitting the lower frequency edge of the victim band.

For those bands that have relatively large $ULCA_{MBW}$ and narrow Duplexer Offset, it's possible that triple beat may hit from the lower side of the victim's downlink band when the victim band's uplink transmits at the lower frequency edge. This condition may be determined in accordance with the following detection criteria:

$$\text{fc\_TB} = f_{alloc\_c} - (f3c - f2c) = \text{fc\_tx} - TX_{MBW}/2 + TX_{allocBW}/2 - (f3c - f2c),$$

$$\text{BW\_TB} = TX_{allocBW} + BW2 + BW3$$

$$\text{f\_TB\_loweredge} = \text{fc\_TB} + \text{BW\_TB}/2 = \text{fc\_tx} - TX_{MBW}/2 + TX_{allocBW}/2 - (f3c - f2c) + (TX_{allowBW} + BW2 + BW3)/2 = \text{fc\_tx} - TX_{MBW}/2 - (f3c - BW3/2) + (f2c + BW2/2) + TX_{allocBW}$$

where $TX_{MBW}$ is the victim band's TX maximum transmission bandwidth, $TX_{allocBW}$ is the TX allocated bandwidth, and $f_{alloc\_c}$ is the center frequency of the allocated TX signal.

In various embodiments, detection of the triple beat condition includes identifying when the triple beat starts to overlap the victim's Rx band, e.g., when TB_upperedge is above the Rx_loweredge, which may be determined in accordance with the following detection criteria:

$$\text{f\_TB\_upperedge} > \text{fc\_rx} - RX_{BW}/2,$$

which may be rewritten as:

$$\text{fc\_tx}-TX_{MBW}/2-(f3c-BW3/2)+(f2c+BW2/2)+TX_{allocBW}>\text{fc\_rx}-RX_{BW}/2,$$

which may be re-arranged as:

$$-(\text{fc\_rx}-\text{fc\_tx})>(f3c-BW3/2)-(f2c+BW2/2)+TX_{MBW}/2-RX_{BW}/2-TX_{allocBW}$$

In this example, Duplex_Offset=fc_rx−fc_tx. Substituting it in, we obtain the following triple beat detection equation:

$$-\text{Duplex\_Offset}>ULCA_{MBW}+TX_{MBW}/2-RX_{BW}/2-TX_{allocBW}-BW2-BW3$$

Substituting $TX_{MBW}/2$ with $\text{fc\_tx}-(f_{alloc\_c}+TX_{allocBW}/2)$, gives the equation:

$$-\text{Duplex\_Offset}>ULCA_{MBW}+\text{fc\_tx}-(f_{alloc\_c}-TX_{allocBW}/2)-RX_{BW}/2-TX_{allocBW}-BW2-BW3,$$

which after combing and re-arranging, is the same as equation (8).

Equations (1) through (8) may be combined to detect triple beat in contiguous aggregation carrier scenarios. When the following inequalities are satisfied, the triple beat distortion product overlaps with a victim band's downlink, which means de-sense may happen or it's a potential maximum sensitivity degradation scenario:

Triple beat hits the low side of the victim bands with positive duplex offsets:

Equation (2)

$$\text{Duplex Offset}<(f_{alloc\_c}-\text{fc\_tx})+TX_{allocBW}/2+ULCA_{MBW}+RX_{BW}/2 \tag{2}$$

Equation (5)

Triple beat hits the high side of the victim bands with negative duplex offsets:

$$-\text{Duplex Offset}<-(f_{alloc\_c}-\text{fc\_tx})+TX_{allocBW}/2+ULCA_{MBW}+RX_{BW}/2 \tag{5}$$

Triple beat hits the high side of the victim bands with positive duplex offsets:

Equation (7)

$$\text{Duplex Offset}<(f_{alloc\_c}-\text{fc\_tx})-TX_{allocBW}/2+ULCA_{MBW}-RX_{BW}/2-BW2-BW3 \tag{7}$$

Equation (8)

Triple beat hits the low side of the victim bands with negative duplex offset:

$$-\text{Duplex Offset}>-(f_{alloc\_c}-\text{fc\_tx})-TX_{alllocBW}/2+ULCAM_{MBW}-RX_{BW}/2-BW2-BW2-BW3 \tag{8}$$

Equations (2) and (7) can be combined to define the range when triple beat overlaps with the victim's downlink band for victim bands with positive duplex offsets:

$$(f_{alloc}\text{\_c\_tx})-TX_{allocBW}/2+ULCA_{MBW}-RX_{BW}/2-BW2-BW3<\text{Duplex Offset}<(f_{alloc\_c}-\text{fc\_tx})+TX_{allocBW}/2+ULCA_{MBW}+RW_{BW}/2 \tag{9}$$

Equations (5) and (8) cn be combines to define the range when triple beat oberlaps with the victim's downlink band for victim bands with negative duplex offsets. Below are two representations for negative duplex offset, with both equations being mathematically equivalent, allowing the operator to decide which equation to implement for the avoidance algorithm, Choice 1

Equation includes a negative sign in front of the (negative) Duplex Offset, to make it positive:

$$-(f_{alloc}\text{\_c}-\text{fc\_tx})-TX_{allocBW}/2+ULCA_{MBW}-RX_{BW}/2-BW2-BW3<-\text{Duplex Offset}<-(f_{alloc\_c}-\text{fc\_fc})+TX_{allocBW}/2+ULCA_{MBW}+RX_{BW}/2 \tag{10}$$

Choice 2

Equation includes no negative sign in front of the Duplex Offset:

$$f_{alloc\_c}-\text{fc\_tx})-TX_{allocBW}/2-ULCA_{MBW}-RX_{BW}/2<\text{Duplex Offset}<(f_{alloc\_c}-\text{fc\_tx})+TX_{allocBW}2-UCLA_{MBW}+RX_{BW}/2+BW2+BW3 \tag{11}$$

Figure 6A:
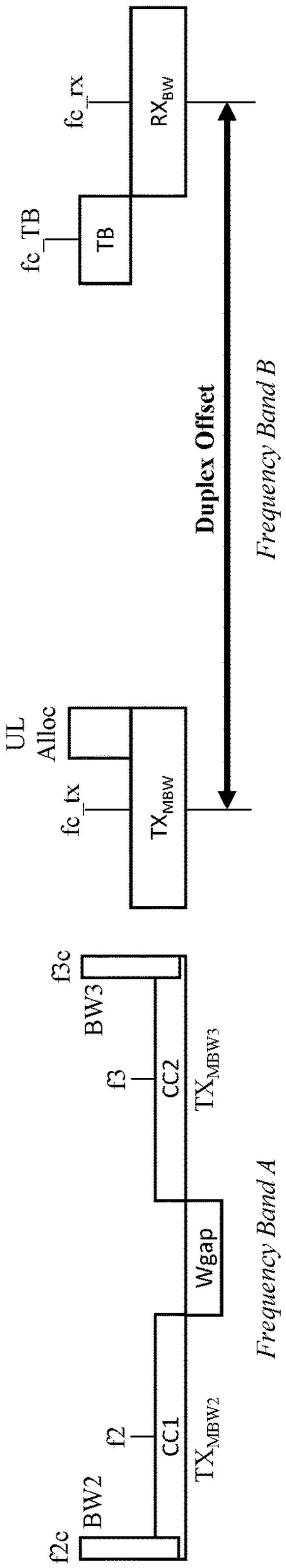
FIGS. 6A and 6B are charts illustrating examples of a triple beat hit condition for a non-contiguous carrier aggregation scenario for victim bands with positive duplex offsets and where the triple beat condition hits a low frequency edge of the victim band, in accordance with one or more embodiments of the present disclosure.

Various embodiments of triple beat detection for non-contiguous carrier aggregations will now be described with reference to FIGS. 6A-9B. FIG. 6A is a chart 600 illustrating an example approach for triple beat detection in a non-contiguous uplink carrier aggregation scenario for victim bands with positive duplex offsets, in accordance with one or more embodiments. In this scenario, there is a gap between carrier bands (represented as Wgap), the victim carrier band is transmitting at a high frequency edge, and the triple beat detection is triggered with a low-side hit.

As illustrated, the center frequencies of the victim band Tx and carrier frequencies CC1 & CC2, are represented as fc_tx, f2c & f3c, respectively, and their allocated bandwidths are represented as $TX_{allocBW}$, BW2 & BW3, respectively. $TX_{MBW2}$ and $TX_{MBW3}$ represent the TX maximum transmission bandwidths for the victim bands, CC1 & CC2, respectively. It is recognized that for most common bands that have a positive duplex offset (e.g., downlink frequency >upload frequency) the following relationships for apply:

$$\begin{aligned}
\text{fc\_TB} &= f_{alloc\_c}+(f3c-f2c)=\text{fc\_tx}+TX_{MBW}/2-TX_{allocBW}/2+(f3c-f2c),\\
\text{BW\_TB} &= TX_{allocBW}+BW2+BW3\\
\text{f\_TB\_upperedge} &= \text{fc\_TB}+\text{BW\_TB}/2\\
&= \text{fc\_tx}+TX_{MBW}/2-TX_{allocBW}/2+(f3c-f2c)+(TX_{allocBW}+BW2+BW3)/2\\
&= \text{fc\_tx}+TX_{MBW}/2+(f3c-f2c)+(BW2+BW3)/2
\end{aligned}$$

where BW2 and BW3 are the transmitted signal BWs of the 2 CCs and $TX_{MBW2}$ and $TX_{MBW3}$ are the maximum bandwidths.

In various embodiments, detection of the triple beat condition includes identifying when the triple beat starts to overlap the victim's receiving (Rx) band, e.g., when TB_upperedge is above the Rx_loweredge, which may be determined in accordance with the following detection criteria:

$$\text{f\_TB\_upperedge}>\text{fc\_rx}-RX_{BW}/2,$$

which may be rewritten as:

$$\text{fc\_tx}+TX_{MBW}/2+(f3c-f2c)+(BW2+BW3)/2>\text{fc\_rx}-RX_{BW}/2,$$

which may be re-arranged as:

$$\text{fc\_rx}-\text{fc\_tx}<(f3c-\mathbf{12}c)+f2c)+BW2/2+BW3/2+TX_{MBW}/2+RX_{BW}/2$$

In this example, Duplex_Offset=fc_rx−fc_tx and f3c−f2c=Wgap+($TX_{MBW2}$+BW2/2+($TX_{MBW3}$−BW3/2), which may be substituted in to produce the following triple beat detection equation:

$$\text{Duplex\_Offset}<Wgap+TX_{MBW}/2+RX_{RW}/2+TX_{MBW2}+TX_{MBW3} \tag{12}$$

After substituting $TX_{MBW}/2$ with $(f_{alloc\_c}+TX_{allocBW}/2)-\text{fc\_tx}$, the following triple beat detection criteria is established:

$$\text{Duplex\_Offset} < \text{Wgap} + f_{alloc\_c} - \text{fc\_tx} + \text{TX}_{allocBW}/2\text{RX}_{BW}/2 + \text{TX}_{MBW2} + \text{TX}_{MBW3} \quad (13)$$

Figure 6B:
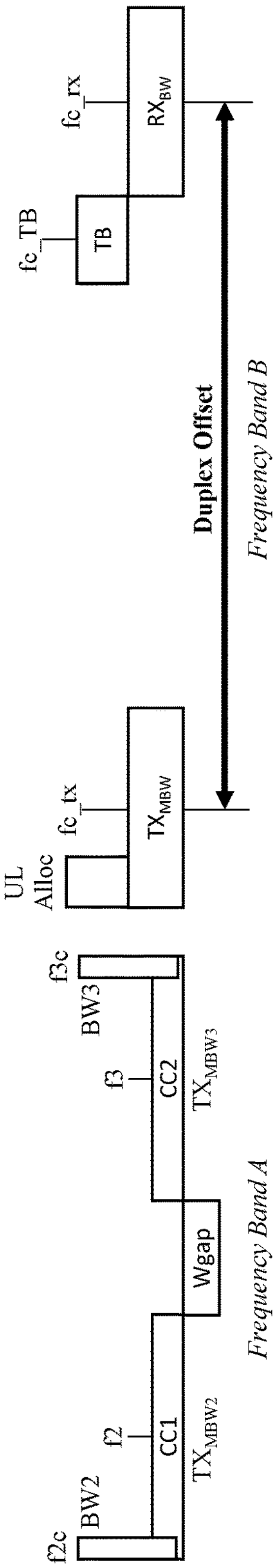

FIG. 6B is a chart 650 illustrating an example approach for triple beat detection in a non-contiguous carrier aggregation scenario for victim bands with positive duplex offsets, in accordance with one or more embodiments. In this scenario, there is a gap between carrier bands, the victim carrier band is transmitting at a low frequency edge, and the triple beat detection is triggered with a low-side hit.

It is recognized that for most common bands that have a positive duplex offset (e.g., downlink frequency >upload frequency) the following relationships for apply:

$$\text{fc\_TB} = f_{alloc\_c} + (f3c - f2c) = \text{fc\_tx} - TX_{MBW}/2 + TX_{allocBW}/2 + (f3c - f2c),$$

$$\text{BW\_TB} = TX_{allocBW} + BW2 + BW3$$

$$\begin{aligned} \text{f\_TB\_upperedge} &= \text{fc\_TB} + \text{BW\_TB}/2 \\ &= \text{fc\_tx} - TX_{MBW}/2 + TX_{allocBW}/2 + (f3c - f2c) + (TX_{allocBW} + BW2 + BW3)/2 \\ &= \text{fc\_tx} - TX_{MBW}/2 + TX_{allocBW} + (f3c - f2c) + (BW2 + BW3)/2 \end{aligned}$$

where $TX_{MBW}$ is TX Maximum transmission bandwidth, and $TX_{allocBW}$ is TX allocated BW.

In various embodiments, detection of the triple beat condition includes identifying when the triple beat starts to overlap the victim's receiving (Rx) band, e.g., when TB_upperedge is above the Rx_loweredge, which may be determined in accordance with the following detection criteria:

$$\text{f\_TB\_upperedge} > \text{fc\_rx} - \text{RX}_{BW}/2,$$

which may be rewritten as:

$$\text{fc\_tx} - \text{TX}_{MBW}/2 + \text{TX}_{allocBW} + (\text{f3c} - \text{f2c}) + (\text{BW2} + \text{BW3})/2 > \text{fc\_rx} - \text{RX}_{BW}/2,$$

which may be re-arranged as:

$$\text{fc\_rx} - \text{fc\_tx} < (\text{f3c}) + \text{BW2}/2 + \text{BW3}/2 - \text{TX}_{BMW}/2 + \text{TX}_{allocBW} + \text{RX}_{BW}/2.$$

After substituting f3c−f2c=Wgap+($TX_{MBW2}$−BW2/2)+($TX_{MBW3}$−BW3/2) and Duplex_Offset =fc_rx_fc_tx, we get $$\text{Duplex\_Offset} < \text{Wgap} + (\text{TX}_{MBW2} - \text{BW2}/2) + (\text{TX}_{MBW3} - \text{BW3}/2) + \text{BW2}/2 + \text{BW3}/2\text{TX}_{MBW}/2 + \text{TX}_{allocBW} + \text{RX}_{BW}/2$$

Therefore, we have the following detection equation:

$$\text{Duplex\_Offset} < \text{W}_{gap} - \text{TX}_{MBW2} + (\text{TX}_{MBW3} - \text{TX}_{MBW}2 + \text{TX}_{allocBW} + \text{RX}_{BW}/2 \quad (14)$$

Substituing $TX_{MBW}/2$ with fc_tx−($f_{alloc\_c}$−$TX_{allocBW}$/2), results in the same equation as equation (13).

Figure 7A:
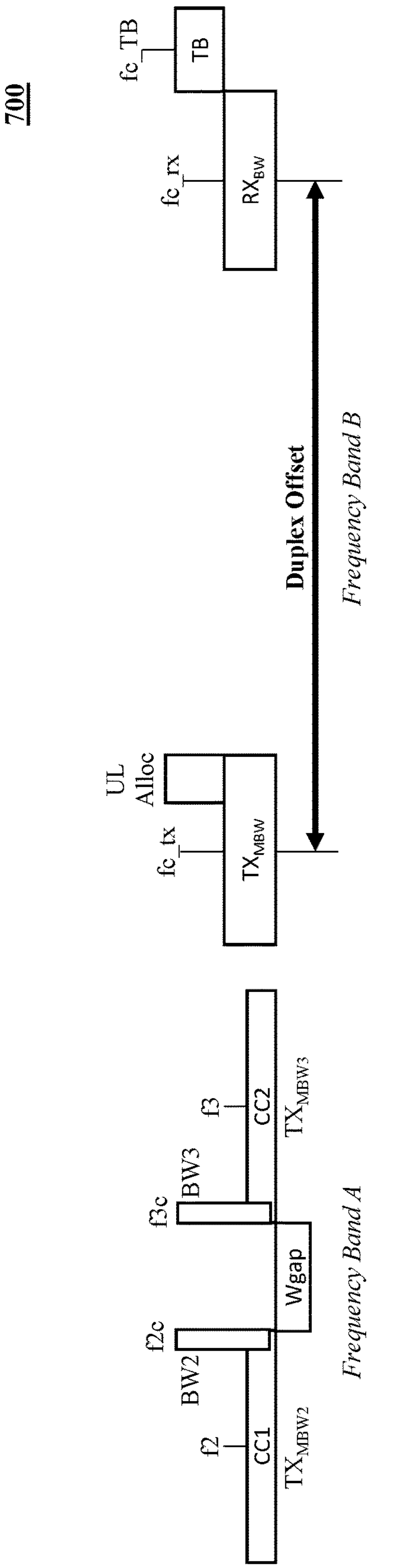
FIGS. 7A and 7B are charts illustrating examples of a triple beat hit condition for a non-contiguous carrier aggregation scenario for victim bands with positive duplex offsets and where the triple beat condition hits a high frequency edge of the victim band, in accordance with one or more embodiments of the present disclosure.

FIG. 7A is a chart 700 illustrating an example approach for triple beat detection in a non-contiguous uplink carrier aggregation scenario for victim bands with positive duplex offsets, in accordance with one or more embodiments. In this scenario, there is a gap between carrier bands, the victim carrier band is transmitting at a high frequency edge, and the triple beat detection is triggered with a high-side hit.

As illustrated, the center frequencies of the victim band TX and carrier frequencies CC1 & CC2, are represented as fc_tx, f2c & f3c, respectively. It is recognized that for most common bands that have a positive duplex offset (e.g., downlink frequency >upload frequency) the following relationships for apply:

$$\text{fc\_TB} = f_{alloc\_c} + (f3c - f2c) = (\text{fc\_tx} + TX_{MBW}/2 - TX_{allocBW}/2) + (Wgap + BW2/2 + BW3/2)$$

$$\text{BW\_TB} = TX_{allocBW} + BW2 + BW3$$

$$\begin{aligned} \text{f\_TB\_loweredge} &= \text{fc\_TB} - \text{BW\_TB}/2 \\ &= \text{fc\_tx} + TX_{MBW}/2 - TX_{allocBW}/2 + Wgap + BW2/2 + BW3/2 - (TX_{allocBW} + BW2 + BW3)/2 \\ &= \text{fc\_tx} + TX_{MBW}/2 - TX_{allowBW} + Wgap \end{aligned}$$

where $TX_{mMBW}$ is TX Maximum transmission bandwidth, and $TX_{allocBW}$ is TX allocated BW. In various embodiments, detection of the triple beat condition includes identifying when the triple beat starts to overlap the victim's receiving (RX) band, e.g., when TB_loweredge is below the Rx_upperedge, which may be determined in accordance with the following detection criteria:

$$\text{f\_TB\_loweredge} < \text{fc\_rx} + \text{RX}_{BW}/2,$$

which may be rewritten as:

$$\text{fc\_tx} + \text{TX}_{RBW}/2 - \text{TX}_{allocBW} + \text{Wgap} < \text{fc\_rx} + \text{RW}_{BW}/2,$$

which may be re-arranged as:

$$\text{fc\_rx} - \text{fc\_tx} > \text{Wgap} + \text{TX}_{MBW}/2 - \text{TX}_{allocBW} - \text{RX}_{BW}/2.$$

In this example, Duplex_Offset=fc_rx−fc_tx, which may be substituted in to produce the following triple beat detection equation for a high side hit:

$$\text{Duplex Offset} > \text{Wgap} + \text{TX}_{BWB}/2 - \text{RX}_{RW}/2 - \text{TX}_{allocBW} \quad (15)$$

After substituting $TX_{MBW}/2$ with ($f_{alloc\_c}$+$TX_{alloc}$/2)−fc_tx, the following triple beat detection equation is established:

$$\text{Duplex Offset} > \text{Wgap} + f_{alloc\_c} - \text{fc\_tx} - \text{TX}_{alloc}/2 - \text{RX}_{BW}2 \quad (16)$$

Figure 7B:
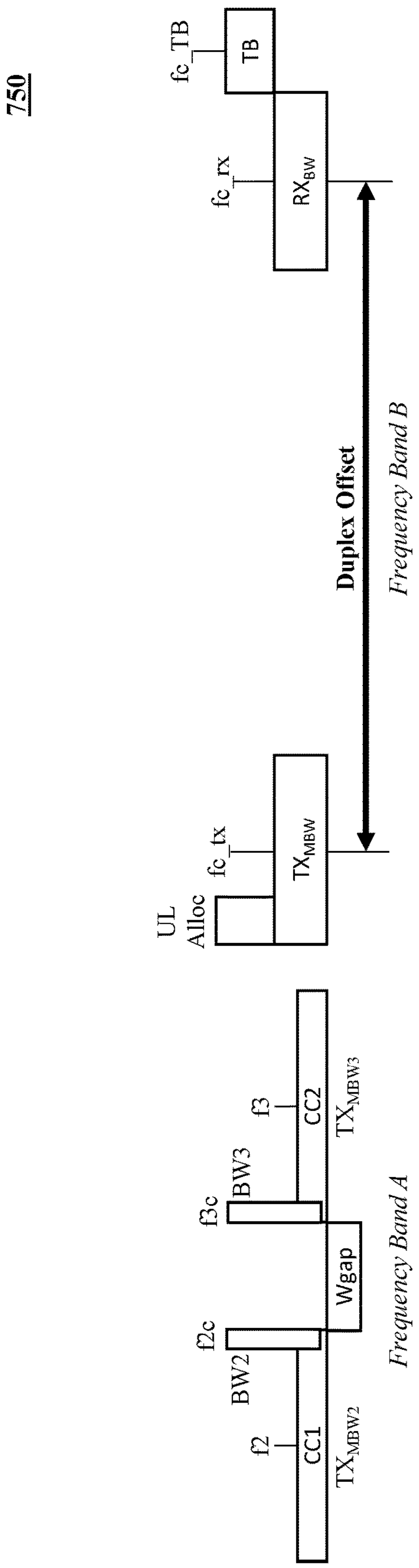

FIG. 7B is a chart 750 illustrating an example approach for triple beat detection in a non-contiguous carrier aggregation scenario for victim bands with positive duplex offsets, in accordance with one or more embodiments. In this scenario, there is a gap between carrier bands, the victim carrier band is transmitting at a low frequency edge, and the triple beat detection is triggered with a high-side hit.

It is recognized that for most common bands that have a positive duplex offset (e.g., downlink frequency >upload frequency) the following relationships for apply:

$$\text{fc\_TB} = f_{alloc\_c} + (f3c - f2c) = (\text{fc\_tx} - TX_{MBW}/2 + TX_{allocBW}/2) + (Wgap + BW2/2 + BW3/2)$$

$$\text{BW\_TB} = TX_{allocBW} + BW2 + BW3$$

$$\begin{aligned} \text{f\_TB\_loweredge} &= \text{fc\_TB} - \text{BW\_TB}/2 \\ &= \text{fc\_tx} - TX_{MBW}/2 + TX_{allocBW}/2 + Wgap + BW2/2 + BW3/2 - (TX_{allocBW} + BW2 + BW3)/2 \\ &= \text{fc\_tx} - TX_{MBW}/2 + Wgap, \end{aligned}$$

where $TX_{MBW}$ is TX maximum transmission bandwidth, and $TX_{allocBW}$ is TX allocated bandwidth.

In various embodiments, detection of the triple beat condition includes identifying when the triple beat starts to overlap the victim's receiving (Rx) band, e.g., when TB_loweredge is below the Rx_upperedge, which may be determined in accordance with the following detection criteria:

$$f\_TB\_loweredge<fc\_rx+RX_{BW}/2.$$

which may be rewritten as:

$$fc\_tx-TX_{MBW}/2+W_{gap}<fc\_rx+RX_{BW}2,$$

which may be re-arranged as:

$$fc\_rx-fc\_tx>Wgap-TX_{MBW}/2-RX_{BW}/2.$$

After substituting f3c−f2c=Wgap+($TX_{MBW2}$−BW2/2)+($TX_{MBW)}$−BW3/2) and Duplex_Offset=fc_rx−fc_tx, the follow equation is derived:

$$Duplex\_Offset<Wgap+(TX_{MBW2}-BW2/2)+(TX_{MBW3}-BW3/2)+BW2/2+BW3/2-TX_{MBW}/2+TX_{allocBW}+RX_{BW}/2$$

Therefore, we have the following detection equation for a high side hit:

$$Duplex\ Offset>Wgap-TX_{MBW}/2-RX_{BW}/2 \qquad (17)$$

After substituting $TX_{MBW}/2$ with fc_tx−($f_{alloc\_c}$−$TX_{allocBW}/2$), the equation is the same equation as equation (16).

Figure 8A:
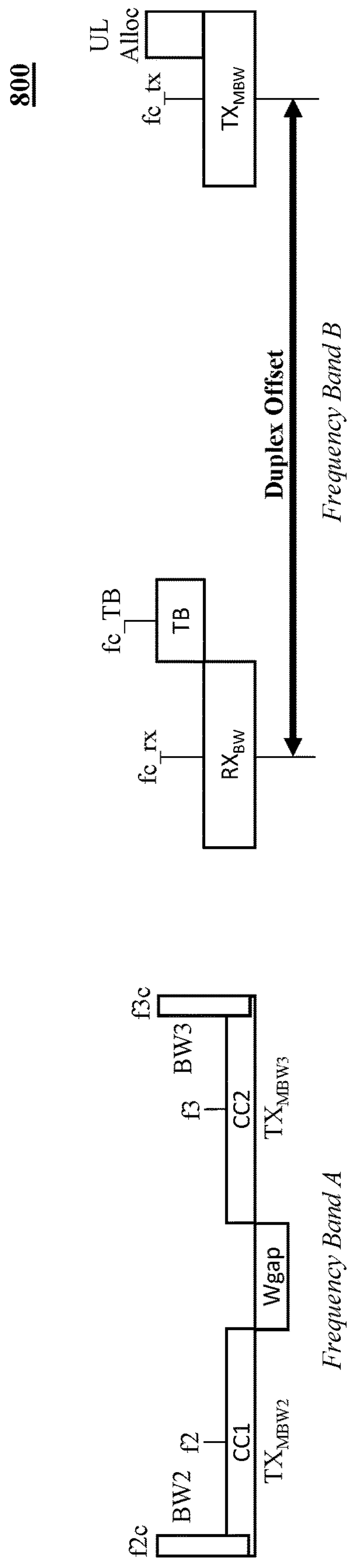
FIGS. 8A and 8B are charts illustrating examples of a triple beat hit condition for a non-contiguous carrier aggregation scenario for victim bands with negative duplex offsets and where triple beat detection is triggered with a high-side hit, in accordance with one or more embodiments of the present disclosure.

FIG. 8A is a chart 800 illustrating an example approach for triple beat detection in a non-contiguous uplink carrier aggregation scenario for victim bands with negative duplex offsets, in accordance with one or more embodiments. In this scenario, there is a gap between carrier bands, the victim carrier band is transmitting at a high frequency edge, and the triple beat detection is triggered with a high-side hit.

As illustrated, the center frequencies of the victim band TX and carrier frequencies CC1 & CC2, are represented as fc_tx, f2c & f3c, respectively, and $TX_{MBW}$, $TX_{MBW2}$ and $TX_{MBW3}$ are represented as the TX Maximum transmission bandwidths for the victim band. It is recognized that for most common bands that have a negative duplex offset (e.g., downlink frequency <upload frequency) the following relationships for apply:

$$fc\_TB = f_{alloc\_c}-(f3c-f2c)=fc\_tx+TX_{MBW}/2-TX_{allocBW}/2-(f3c-f2c),$$

$$BW\_TB = TX_{allocBW}+BW2+BW3$$

$$\begin{aligned} f\_TB\_loweredge &= fc\_TB-BW\_TB/2 \\ &= fc\_tx+TX_{MBW}/2-TX_{allocBW}/2-(f3c-f2c)-(TX_{allowBW}+BW2+BW3)/2 \\ &= fc\_tx+TX_{MBW}/2-(f3c-f2c)-(BW2+BW3/2)-TX_{allocBW} \end{aligned}$$

where BW2 & BW3 are the transmitted signal bandwidths of the 2 CCs (e.g., not the maximum transmission bandwidths, which are designated as $TX_{MBW2}$ and $TX_{MBW3}$).

In various embodiments, detection of the triple beat condition includes identifying when the triple beat starts to overlap the victim's receiving (RX) band, e.g., when TB_loweredge is below the Rx_upperedge, which may be determined in accordance with the following detection criteria:

$$f\_TB\_loweredge<fc\_rx+RX_{BW}/2,$$

which may be rewritten as:

$$fc\_tx+TX_{MBW}/2-(f3c-f2c)-(BW2+BW3/2-TX_{allocBW}<fc\_rx+RX_{BW}/2,$$

which may be re-arranged as:

$$-(fc\_rx-fc\_tx)<(f3c-f2c)+BW2/2+BW3/2-TX_{MBW}/2+RX_{BW}/2+TX_{allocBW}.$$

In this example, Duplex_Offset=fc_rx−fc_tx and f3c−f2c=Wgap+($TX_{BMW2}$−BW2/2)+($TX_{MBW3}$−BW3/2), which may be substituted in to produce the following triple beat detection equation:

$$-Duplex\_Offset<Wgap+(TX_{MBW2}-BW2/2)+(TX_{MBW3}-BW3/2)+BW2/2+BW3/2-TX_{MBW}/2+RX_{BW}/2+TX_{allocBW}.$$

Therefore, the following triple beat detection equation is established:

$$-Duplex\_Offset<Wgap-TX_{MBW}/2+RX_{BW}2+TX_{MBW2}+TX_{MBW3}+TX_{allocBW} \quad (18\ )$$

After sibstotuing $TX_{MBW}/2$ with ($f_{alloc\_c}$+$TX_{allocBMW}/2$)−fc_tx, the following truple beat detection criteria is established:

$$-Duplex\_Offset<Wgap-f_{alloc\_c}+fc\_tx+TX_{allocBW}/2+RX_{RW}2+TX_{MBW1}+TX_{MBW3} \qquad (19)$$

Figure 8B:
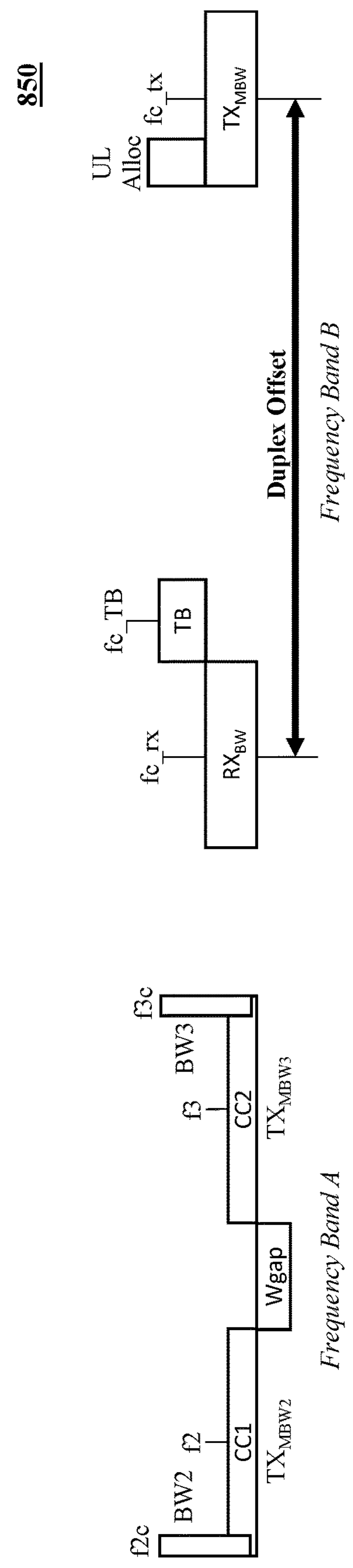

FIG. 8B is a chart 850 illustrating an example approach for triple beat detection in a non-contiguous carrier aggregation scenario for victim bands with negative duplex offsets, in accordance with one or more embodiments. In this scenario, there is a gap between carrier bands, the victim carrier band is transmitting at a low frequency edge, and the triple beat detection is triggered with a high-side hit.

In this example, $TX_{MBW}$, $TX_{MBW2}$ and $TX_{MBW3}$ represent the TX Maximum transmission bandwidths for the victim band, CC1 & CC2 respectivelym, and f2c & f3c represent the center frequencies of the actually transmitted 2CC uplink signals (e.g., not the center of CC1 & CC2, which are designated as f2c & f3c). It is recognized that for most common bands that have a negative duplex offset (e.g., downlink frequency <upload frequency) the following relationships for apply:

$$fc\_TB = f_{alloc\_c}-(f3c-f2c)=fc\_tx-TX_{MBW}/2+TX_{allocBW}/2-(f3c-f2c),$$

$$BW\_TB = TX_{allocBW}+BW2+BW3$$

$$\begin{aligned} f\_TB\_loweredge &= fc\_TB-BW\_TB/2 \\ &= fc\_tx-TX_{MBW}/2+TX_{allocBW}/2-(f3c-f2c)-(TX_{allowBW}+BW2+BW3)/2 \\ &= fc\_tx-TX_{MBW}/2-(f3c-f2c)-(BW2+BW3/2), \end{aligned}$$

where BW2 & BW3 are transmitted signal bandwidths of the 2 CCs (e.g., not the maximum transmission BWs, which are designated as $TX_{MBW2}$ and $TX_{MBW3}$).

In various embodiments, detection of the triple beat condition includes identifying when the triple beat starts to overlap the victim's receiving (Rx) band, e.g., when TB_loweredge is below the Rx_upperedge, which may be determined in accordance with the following detection criteria:

$$f\_TB\_loweredge<fc\_rx+RX_{BW}/2,$$

which may be rewritten as:

$$fc\_tx-TX_{MBW}/2(f3c-f2c)-(BW2+BW3)/2<fc\_rx+RX_{BW}/2,$$

which may be re-arranged as:

$$-(fc\_rx-fc\_tx)<(f3c-f2c)+BW/2+BW3/2+TX_{MBW}/2+RX_{BW}/2,$$

After substituting f3c−f2c=Wgap+($TX_{MBW3}$−BW2/2)+($TX_{MBW3}$−BW3/2 ) and Duplex_Offset=fc_rx_fc_tx, the follow equation is derived:

$$-Duplex\_Offset<Wgap+(TX_{MBW}/2+RX_{BW}2/2+TX_{MBW2}+TX_{MBW3} \quad (20)$$

Therefore, the following detection equation for a high side hit is derived:

$$-Duplex\_Offset<Wgap+TX_{MBW}/2+RX_{BW}/2+TX_{MBW2}+TX_{MBW3} \quad (20)$$

After substituting $TX_{MBW}/2$ with fc_tx−($f_{alloc\_c}$−$TX_{allocBW}$/2), the equation is shown to be the same equation as equation (19).

Figure 9A:
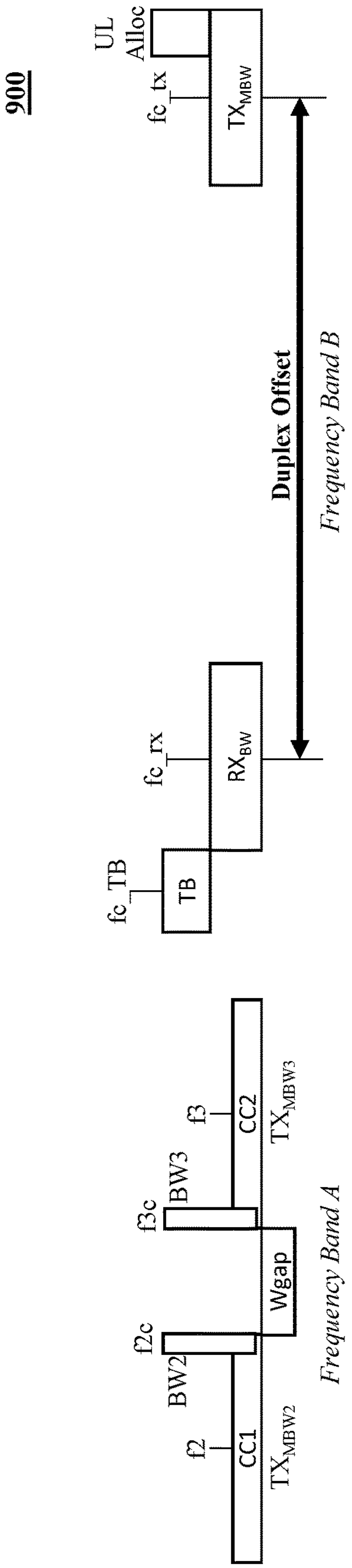
FIGS. 9A and 9B are charts illustrating examples of a triple beat hit condition for a non-contiguous carrier aggregation scenario for victim bands with negative duplex offsets and where triple beat detection is triggered with a low-side hit, in accordance with one or more embodiments of the present disclosure.

FIG. 9A is a chart 900 illustrating an example approach for triple beat detection in a non-contiguous uplink carrier aggregation scenario for victim bands with negative duplex offsets, in accordance with one or more embodiments. In this scenario, there is a gap between carrier bands, the victim carrier band is transmitting at a high frequency edge, and the triple beat detection is triggered with a low-side hit.

As illustrated, $TX_{MBW}$, and $TX_{MBW2}$ and $TX_{MBW3}$ represent the TX Maximum transmission bandwidths for the victim band, CC1 & CC2 respectively, and f2c & f3c represent the center frequencies of the actually transmitted 2CC uplink signals. It is recognized that for most common bands that have a negative duplex offset (e.g., downlink frequency <upload frequency) the following relationships for apply:

$$
\begin{aligned}
&fc\_TB = \\
&\quad f_{alloc\_c}-(f3c-f2c) = fc\_tx + TX_{MBW}/2 - TX_{allocBW}/2 - (f3c-f2c),\\
&\quad BW\_TB = TX_{allocBW} + BW2 + BW3\\
&\quad f\_TB\_upperedge = fc\_TB + BW\_TB/2\\
&\qquad = fc\_tx - TX_{MBW}/2 - TX_{allocBW}/2 - (f3c-f2c) + (TX_{allocBW} + BW2 + BW3)/2\\
&\qquad = fc\_tx + TX_{MBW}/2 - (f3c-f2c) + (BW2 + BW3)/2
\end{aligned}
$$

where BW2 & BW3 are transmitted signal BWs of the 2 CCs (not the maximum transmission BWs, which are designated as $TX_{MBW2}$ and $TX_{MBW3}$). In various embodiments, detection of the triple beat condition includes identifying when the triple beat starts to overlap the victim's receiving (RX) band, e.g., when TB_upperedge is above the Rx_loweredge, which may be determined in accordance with the following detection criteria:

$$f\_TB\_upperedge > fc\_rx-RX_{BW}/2$$

which may be rewritten as:

$$fc\_tx+TX_{MBW}/2-(f3c-f2c)+(BW2+BW3/2>fc\_rx-RX_{BW}/2,$$

which may be re-arranged as:

$$-(fc\_rx-fc\_tx)>(f3c-f2c)-BW2/2-BW3/2-TX_{BMW}/2-RX_{BW}/2.$$

In this example, f3c−f2c=Wgap+BW2/2+BW3/2, and Duplex_Offset=fc_rx−fc_tx, which may be substituted in to produce the following triple beat detection equation:

$$Duplex\_Offset>Wgap+BW2/2+BW3/2-BW2/2-BW3/2-TX_{MBW}/2.$$

Therefore, the following triple beat detection equation is established:

$$-Duplex\_Offset>Wgap-TX_{MBW}/2-RX_{BW}2 \quad (21)$$

After substituting $TX_{MBW}/2$ with ($f_{alloc\_c}$+$TX_{allocBW}$/2)−fc_tx, the following triple beat detection criteria is established:

$$-Duplex\_Offset>Wgap-f_{alloc\_c}+fc\_tx-TX_{allocBW}/2-RX_{BW}2 \quad (22)$$

Figure 9B:
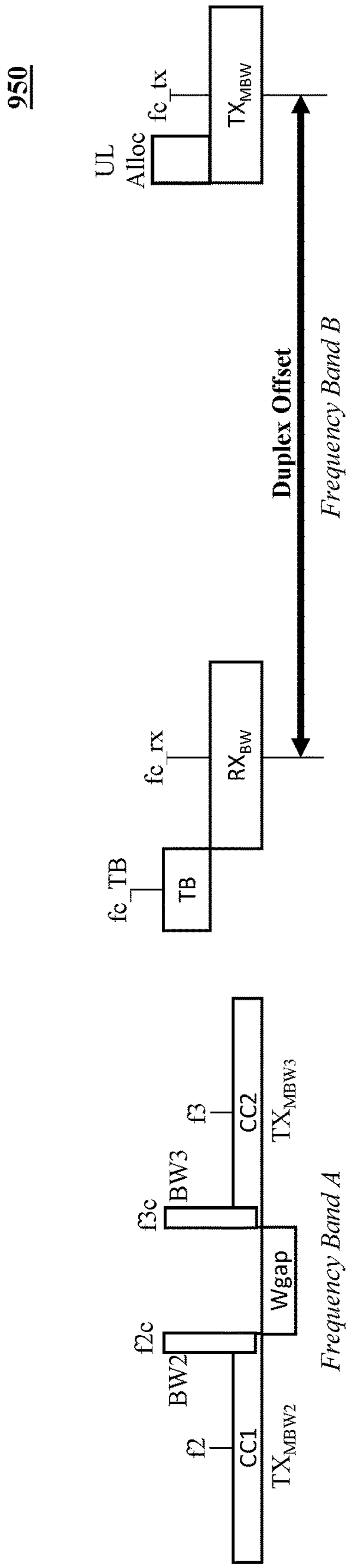

FIG. 9B is a chart 50 illustrating an example approach for triple beat detection in a non-contiguous carrier aggregation scenario for victim bands with negative duplex offsets, in accordance with one or more embodiments. In this scenario, there is a gap between carrier bands, the victim carrier band is transmitting at a low frequency edge, and the triple beat detection is triggered with a low-side hit.

In this example, $TX_{MBW}$, $TX_{MBW2}$ and $TX_{MBW3}$ represent the TX maximum transmission bandwidths for the victim band, CC1 & CC2, respectively, and f2c & f3c represent the center frequencies of the actually transmitted 2CC uplink signals (e.g., not the center of CC1 & CC2, which are designated as f2 & f3). It is recognized that for most common bands that have a negative duplex offset (e.g., downlink frequency <upload frequency) the following relationships for apply:

$$
\begin{aligned}
&fc\_TB = \\
&\quad f_{alloc\_c}-(f3c-f2c) = fc\_tx - TX_{MBW}/2 + TX_{allocBW}/2 - (f3c-f2c),\\
&\quad BW\_TB = TX_{allocBW} + BW2 + BW3\\
&\quad f\_TB\_upperedge = fc\_TB + BW\_TB/2\\
&\qquad = fc\_tx - TX_{MBW}/2 + TX_{allocBW}/2 - (f3c-f2c) + (TX_{allocBW} + BW2 + BW3)/2\\
&\qquad = fc\_tx - TX_{MBW}/2 + TX_{allocBW} - (f3c-f2c) + (BW2 + BW3)/2
\end{aligned}
$$

where BW2 & BW3 are transmitted signal BWs of the 2 CCs (e.g., not the maximum transmission bandwidths, which are designated as $TX_{MBW2}$ and $TX_{MBW3}$).

In various embodiments, detection of the triple beat condition includes identifying when the triple beat starts to overlap the victim's receiving (Rx) band, e.g., when TB_upperedge is below the Rx_loweredge, which may be determined in accordance with the following detection criteria:

$$f\_TB\_upperedge>fc\_rx-RX_{BW}2,$$

which may be rewritten as:

$$fc\_tx\_TX_{MBW}/2+TX_{allocBw}-(f3c-f2c)+(BW2+BW3)/2>fc\_rx\_-RX_{BW}/2,$$

which may be re-arranged as:

$$fc\_tx-TX_{BMW}/2+TX_{allocBW}-(f3c-f2c)+(BW2+BW3/2>fc\_rx-RX_{BW}/2.$$

After substituting in f3c−f2c=Wgap+BW2/2+BW3/2, and Duplex_Offset=fc_rx−fc_tx, the follow equation is derived: −Duplex_Offset>Wgap+BW2/2+BW3/2−BW2/2−BW3/2+$TX_{MBW}/2-RX_{BW}/2-TX_{allocBW}$ Therefore, the following detection equation is derived:

$$-Duplex\_Offset>Wgap+TX_{MBW}/2-RX_{BW}/2-TX_{allocBW} \quad (23)$$

After substituting $TX_{MBW}/2$ with $fc\_tx-(f_{alloc\_c}-TX_{allocBW}/2)$, the equation is shown to be the same equation as equation (22).

Equations (12) through (23) may be combined to detect triple beat in non-contiguous aggregation carrier scenarios. When the following inequalities are satisfied, the triple beat distortion product overlaps with a victim band's downlink, which means de-sense may happen or it's a potential maximum sensitivity degradation scenario:

Equation (13)

Triple beat hits low side of victim bands with positive duplex offsets:

$$Duplex\_Offset<Wgap+f_{alloc\_c}-fc\_tx+TX_{allocBW}/2+TX_{MBW2}+Tx_{MBW3} \quad (13)$$

Equation (16)

Triple beat hits high side of victim bands with positive duplex offsets:

$$Duplex\ Offset>Wgap+f_{alloc\_c}-fc\_tx-TX_{allocBW}/2-RX_{BW}/2 \quad (16)$$

Equations (13) and (16) can be combined to define the range when triple beat overlaps with the victim's downlink band for victim bands with positive duplex offsets:

$$Wgap+f_{alloc\_c}-fc\_tx-TX_{allocBW}/2-RX_{BW}/2<Duplex\ Offset<Wgap+f_{alloc\_c}-fc\_tx+TX_{allocBW}/2+RX_{BW}2+TX_{MBW2}+TX_{MBW3} \quad (24)$$

Equation (19)

Triple beat hits high side of victim bands with negative duplex offsets:

$$-Duplex\_Offset<Wgap-f_{alloc\_c}+fc\_tx+TX_{allocBW}/2+RX_{BW}/2+TX_{MBW2}+TX_{MBW3} \quad (19)$$

Equation (22)

Triple beat hits low side of victim bands with negative duplex offsets:

$$-Dupex\_Offset>Wgap-f_{alloc\_c}+fc\_tx-TX_{allocBW}/2-RX_{BW}/2 \quad (22)$$

Equations (19) and (22) can be combined to define the range when triple beat overlaps with the victim's downlink band for victim bands with negative duplex offsets. Below are two mathematically equivalent representations for negative duplex offset, and the operator can decide which equation to implement for an avoidance algorithm.

Choice 1

A negative sign in front of the negative duplex offset to make it positive:

$$Wgap-f_{alloc\_c}+fc\_tx-TX_{allocBW}/2-BW_{BW}/2<-Duplex\_Offset<Wgap-f_{alloc\_c}+fc\_tx+TX_{allocBW}/2+RX_{BW}2+TX_{MBW2+}TX_{MBW3} \quad (25)$$

Choice 2:

No negative sign in front of the duplex offset:

$$-Wgap+f_{alloc\_c}-fc\_tx-TX_{allocBW}/2-RX_{RW}/2-TX_{MBW2}-TX_{MBW3}<Duplex\ Offset<-Wgap+f_{alloc\_c}-fc\_tx+TX_{allocBW}/2+RX_{BW}/2 \quad (26)$$

FIGS. 10-14 illustrate flow diagrams of example processes for implementing triple beat detection and mitigation in accordance with one or more embodiments of the present disclosure. In some embodiments, the operations of FIGS. 10-14 may be implemented with any combination of electronic hardware and/or software instructions executed by one or more logic devices associated with corresponding electronic devices, modules, processes, and/or structures depicted or described herein (including as described with reference to any of FIGS. 1-9B) or other device as appropriate.

Any step, sub-step, sub-process, or block of the processes may be performed in an order or arrangement different from the embodiments illustrated by FIGS. 10-14. For example, in other embodiments, one or more blocks may be omitted from the processes, and other blocks may be included. Furthermore, block inputs, block outputs, various sensor signals, sensor information, calibration parameters, and/or other operational parameters may be stored to one or more memories prior to moving to a following portion of the processes. Although the processes are described with reference to systems, devices, processes, and elements of FIGS. 1-9B, the processes may be performed by other systems, devices, and elements, and including a different selection of electronic systems, devices, elements, assemblies, and/or arrangements.

Figure 10:
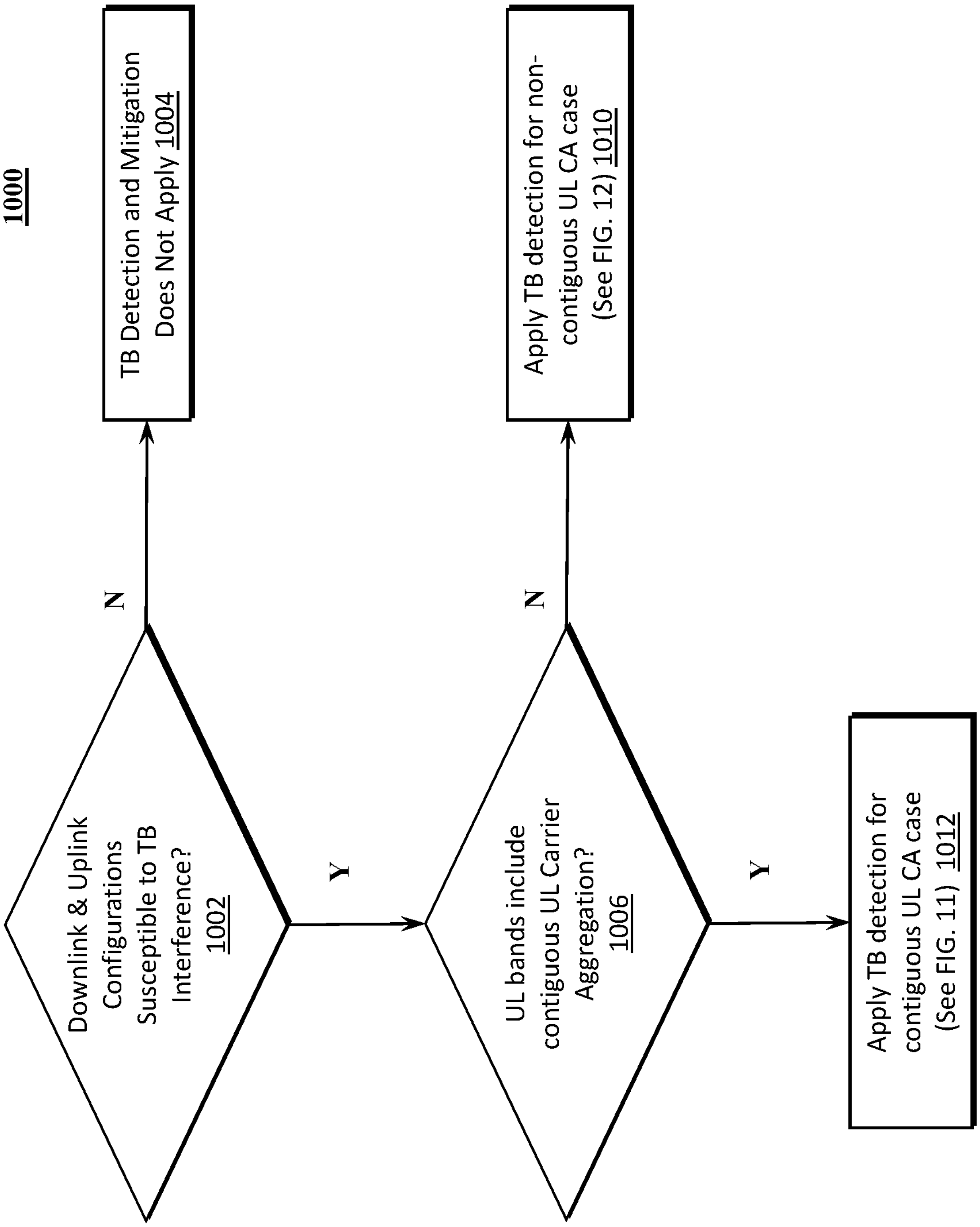
FIG. 10 is a flow chart illustrating an example of a high-level triple beat detection process, in accordance with one or more embodiments of the present disclosure.

Referring to FIG. 10, an example process 1000 for implementing triple beat detection and mitigation will now be described in accordance with one or more embodiments of the present disclosure. The process 1000 begins at block 1002, where the system (e.g., a computing device associated with a base station, such as host system 110) determines whether the current downlink and uplink configurations are susceptible to triple beat interference. In some embodiments, the system evaluates configuration data and criteria for eligible combinations of downlink and uplink configurations. If the criteria is satisfied, then operation passes to block 1006 for implementing triple beat detection and mitigation. If the criteria not satisfied, then the triple beat detection and mitigation processes described herein do not apply and are not implemented (block 1004). In some embodiments, the criteria includes determining whether the downlink configuration includes two or more inter-band carrier aggregation or dual connectivity band combinations, and/or whether the uplink configuration includes an uplink inter-band combination with three uplink CCs in two uplink clusters.

In block 1006, the system determines whether the UL bands include contiguous UL carrier aggregation. If the UL bands include contiguous UL carrier aggregation then the process proceeds to block 1012 to implement triple beat detection for contiguous UL carrier aggregation. Otherwise, the process proceeds to block 1010 to implement triple beat detection for non-contiguous UL carrier aggregation.

Figure 11:
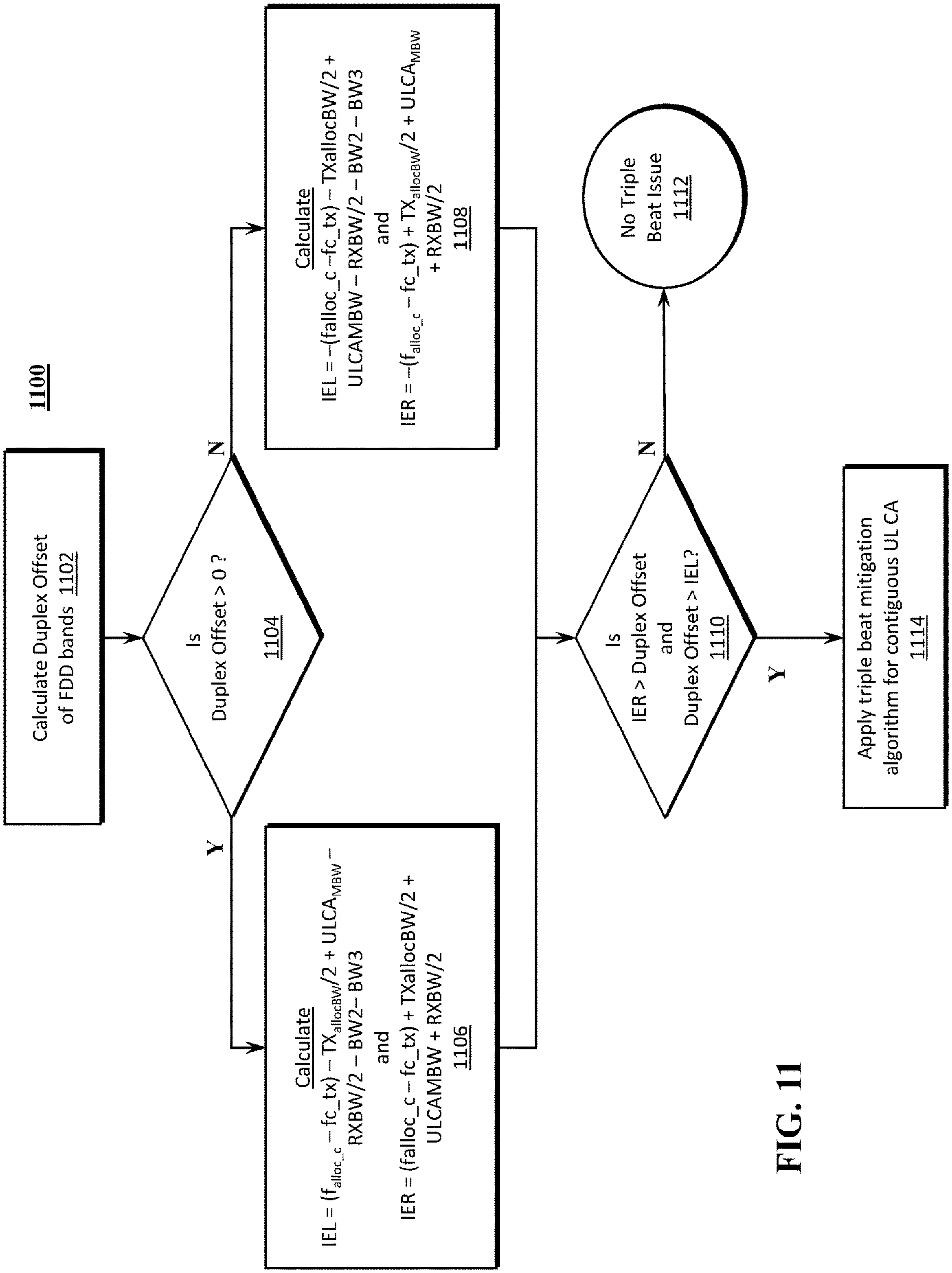
FIG. 11 is a flow chart illustrating an example triple beat detection process for detecting triple beat in a contiguous carrier aggregation scenario, in accordance with one or more embodiments of the present disclosure.

Referring to FIG. 11, an example process 1100 for implementing triple beat detection for a contiguous uplink carrier aggregation scenario will now be described in accordance with one or more embodiments of the present disclosure. In some embodiments, the process 1100 is implemented when control passes to block 1012 in FIG. 10.

In block 1102, a duplex offset, fc_rx−fc_tx is calculated for the FDD bands. The duplex offset and related equations may be calculated in accordance with the equations described with reference to FIGS. 2A-5B herein. In block 1104, if the duplex offset of greater than zero, then control is passed to block 1106. In block 1106 the following values are calculated from equation (9):

$$IEL=(f_{alloc\_c}-fc\_tx)-TX_{allocBW}/2+ULCA_{MBW}-RX_{BW}/2-BW2-BW3$$

$$IER=(falloc\_c-fc\_tx)+TX_{allocBW}/2+ULCA_{MBW}+RX_{BW}2$$

If the duplex offset is not greater than zero, then contro passes to block 1108, where the following values are calculated from equation (10):

$$IEL=-(falloc\_c-fc\_tx)-TX_{allocBW}/2+ULCA_{MBW}-RX_{RW}/2-BW2-BW3$$

$$IER=-(falloc\_c-fc\_tx)+TX_{allocBW}/2+ULCA_{MBW}+RX_{BW}/2$$

In block 1110, the duplex offset is compared to the calculated IEL and IER values. If IER >Duplex Offset>IEL, then triple beat mitigation for contiguous ULCA is performed (block 1114). Otherwise, there is no triple beat issue detected with the band allocations (block 1112).

Figure 12:
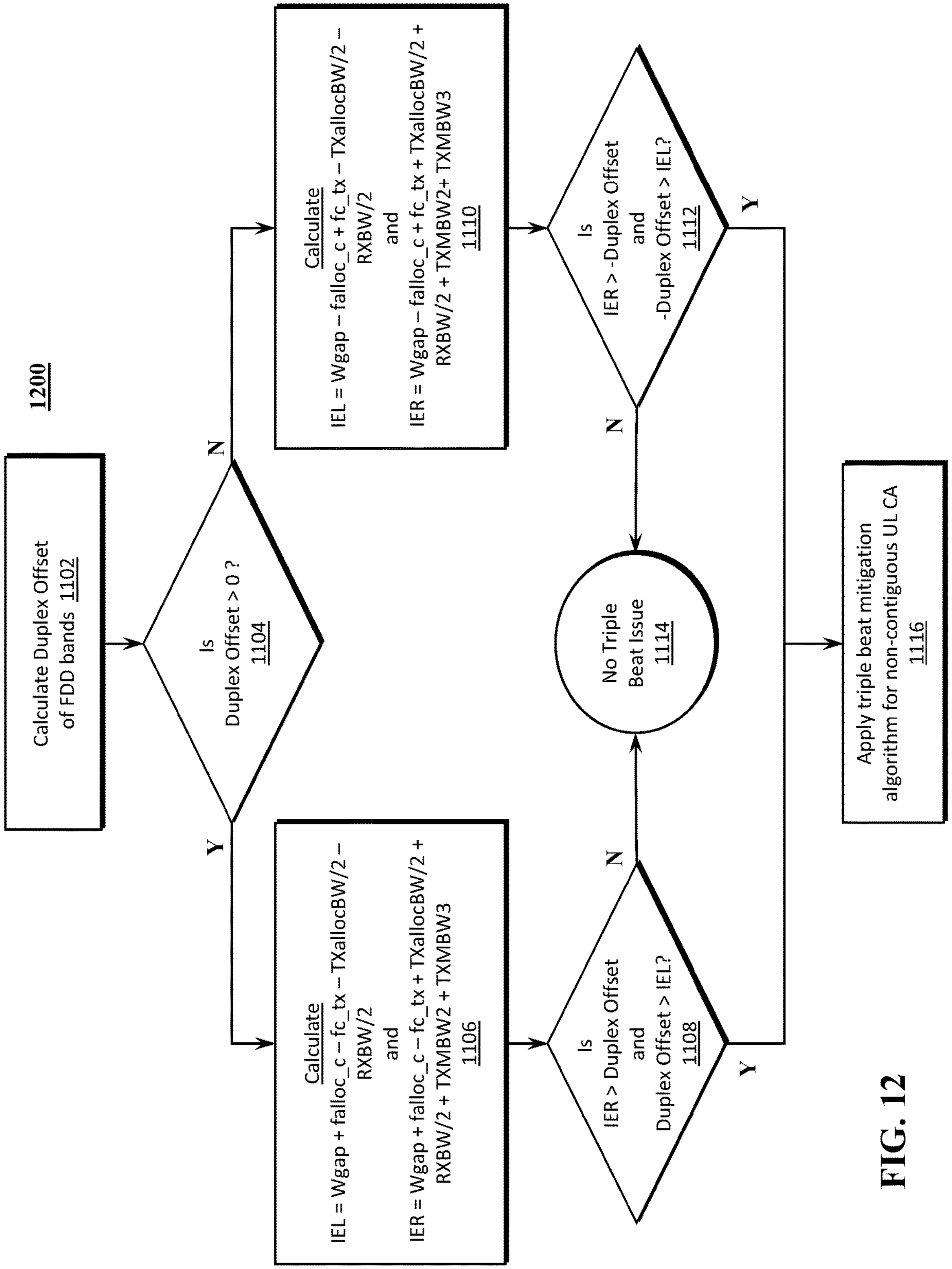
FIG. 12 is a flow chart illustrating an example triple beat detection process for detecting triple beat in a non-contiguous carrier aggregation scenario, in accordance with one or more embodiments of the present disclosure.

Referring to FIG. 12, an example process 1200 for implementing triple beat detection for a non-contiguous ULCA case will now be described in accordance with one or more embodiments of the present disclosure. In some embodiments, the process 1200 is implemented when control passes to block 1010 in FIG. 10.

In block 1202, the duplex offset is calculated for the FDD bands. The duplex offset and other calculation of FIG. 12 may be calculated in accordance with the equations described with reference to FIGS. 6A-9B herein. In block 1204, if the duplex offset is greater than zero, then control passes to block 1106, where the following values are calculated in accordance with equation (24):

$$IEL=Wgap+f_{alloc\_c}-fc\_tx-TX_{allocBW}/2-RX_{BW}/2$$

$$IER=Wgap+f_{alloc\_c}-fc\_tx+TX_{allocBW}/2+RX_{BW}/2+TX_{MBW2}+TXM_{BW3}$$

Next, in block 1108, if TER>Duplex Offset>IEL, then triple beat mitigation for non-contiguous ULCA is performed (block 1116). Otherwise, there is no triple beat issue (block 114).

If in block 1104, the duplex offset is not greater than zero, then control passes to block 1110, where the following values are calculated in accordance with equation (25):

$$IEL=Wgap-f_{alloc\_c}+fc\_tx-TX_{allocBw}/2-RX_{BW}/2$$

$$IER=Wgap-f_{alloc\_c}+fc\_tx+TX_{allocBW}/2+RX_{BW}/2+TX_{MBW}2+TM_{BW3}$$

Next, in block 1112, if IER>-Duplex Offset>IEL, then triple beat mitigation for non-contiguous ULCA is performed (block 1116). Otherwise, there is no triple beat issue (block 114).

Figure 13:
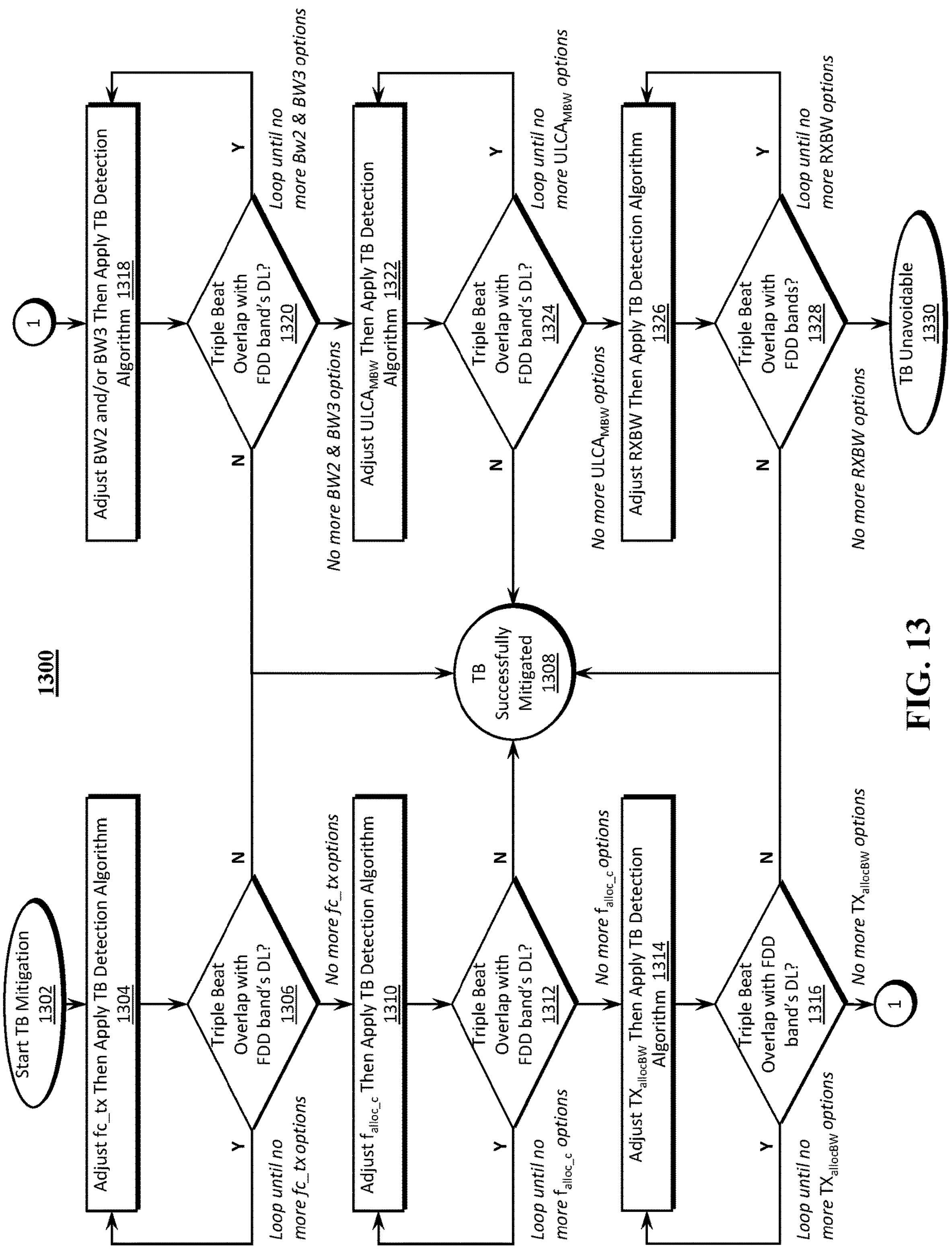
FIG. 13 is a flow chart illustrating an example triple beat mitigation process for use in a contiguous carrier aggregation scenario, in accordance with one or more embodiments of the present disclosure.

FIG. 13 illustrates an example process 1300 for mitigating and/or avoiding triple beat interference in a contiguous ULCA, in accordance with one or more embodiments of the present disclosure. The process 1300 may be initiated (block 1302), for example, from block 1114 in FIG. 11 when triple beat interference is detected.

In block 1304, the parameter fc_tx is adjusted and the triple beat detection algorithm (e.g., the process 1100 of FIG. 11) is run with the new parameters. In various embodiments, the parameter fc_tx may be adjusted by increasing the value of fc_tx, decreasing the value of fc_tx, or through other adjustments. In some embodiments, a step size adjustment is applied to the parameter of fc_tx. In block 1306, if after the adjustment of fc_tx the triple beat no longer overlaps with the FDD bands, then triple beat has been successfully mitigated and the process 1300 ends (block 1308). If after the adjustment of fc_tx the triple beat still overlaps with the FDD bands, then fc_tx is re-adjusted to a new (untested) value and the process of blocks 1304 and 1306 repeats, until either an fc_tx value is found for which the triple beat no longer overlaps with the FDD bands (and the process ends at block 1308) or there are no more fc_tx values to test.

In block 1310, the parameter $f_{alloc\_c}$ is adjusted and the triple beat detection algorithm (e.g., the process 1100 of FIG. 11) is run with the new parameters. In various embodiments, the parameter $f_{alloc\_c}$ may be adjusted by increasing the value of $f_{alloc\_c}$, decreasing the value of $f_{alloc\_c}$, or through other adjustments. In some embodiments, a step size adjustment is applied to the parameter of $f_{alloc\_c}$.

In block 1312, if after the adjustment of $f_{alloc\_c}$ the triple beat no longer overlaps with the FDD bands, then triple beat has been successfully mitigated and the process 1300 ends (block 1308). If after the adjustment of $f_{alloc\_c}$ the triple beat still overlaps with the FDD bands, then $f_{alloc\_c}$ is re-adjusted to a new (untested) value and the process of blocks 1310 and 1312 repeats, until either an falloc_c value is found for which the triple beat no longer overlaps with the FDD bands (and the process ends at block 1308) or there are no more $f_{alloc\_c}$ values to test.

In block 1314, the parameter $TX_{allocBW}$ is adjusted and the triple beat detection algorithm (e.g., the process 1100 of FIG. 11) is run with the new parameters. In various embodiments, the parameter $TX_{allocBW}$ may be adjusted by increasing the value of $TX_{allocBW}$, decreasing the value of $TX_{allocBW}$, or through other adjustments. In some embodiments, a step size adjustment is applied to the parameter of $TX_{allocBW}$. In block 1316, if after the adjustment of $TX_{allocBW}$ the triple beat no longer overlaps with the FDD bands, then triple beat has been successfully mitigated and the process 1300 ends (block 1308). If after the adjustment of TXallocgw the triple beat still overlaps with the FDD bands, then $TX_{allocBW}$ is re-adjusted to a new (untested) value and the process of blocks 1314 and 1316 repeats, until either an $TX_{allocBW}$ value is found for which the triple beat no longer overlaps with the FDD bands (and the process ends at block 1308) or there are no more $TX_{allocBW}$ values to test.

In block 1318, the parameters BW2 and/or BW3 are adjusted and the triple beat detection algorithm (e.g., the process 1100 of FIG. 11) is run with the new parameters. In various embodiments, the parameters BW2 and BW3 may be adjusted individually by increasing the value of BW2 and/or BW3, decreasing the value of BW2 and/or BW3, or through other adjustments. In some embodiments, a step size adjustment is applied to one of parameters BW2 and BW3. In block 1320, if after the adjustment of BW2 and BW3 the triple beat no longer overlaps with the FDD bands, then triple beat has been successfully mitigated and the process 1300 ends (block 1308). If after the adjustment of BW2 and BW3 the triple beat still overlaps with the FDD bands, then BW2 and/or BW3 is re-adjusted to new (untested) values and the process of blocks 1318 and 1320 repeats, until either a BW2 and/or BW3value is found for which the triple beat no longer overlaps with the FDD bands (and the process ends at block 1308) or there are no more BW2 and BW3 values to test. In some embodiments, one parameter (e.g., BW2) may be adjusted first until there are no more values to test, and then the second parameter (e.g., BW3) may be adjusted.

In block 1322, the parameter ULCAm B w is adjusted and the triple beat detection algorithm (e.g., the process 1100 of FIG. 11) is run with the new parameters. In various embodiments, the parameter $ULCA_{MBW}$ may be adjusted by increasing the value of $ULCA_{MBW}$, decreasing the value of $ULCA_{MBW}$, or through other adjustments. In some embodiments, a step size adjustment is applied to the parameter of $ULCA_{MBW}$. In block 1324, if after the adjustment of ULCAm B w the triple beat no longer overlaps with the FDD bands, then triple beat has been successfully mitigated and the process 1300 ends (block 1308). If after the adjustment of $ULCA_{MBW}$ the triple beat still overlaps with the FDD bands, then $ULCA_{MBW}$ is re-adjusted to a new (untested) value and the process of blocks 1322 and 1324 repeats, until either a $ULCA_{MBW}$ value is found for which the triple beat no longer overlaps with the FDD bands (and the process ends at block 1308) or there are no more ULCAmBw values to test.

If there are no more ULCAmBw values to test, then process 1300 proceeds to block 1326. In block 1326, the parameter RX B w is adjusted and the triple beat detection algorithm (e.g., the process 1100 of FIG. 11) is run with the adjusted $RX_{BW}$ value. In various embodiments, the parameter RX B w may be adjusted by increasing the value of $RX_{BW}$, decreasing the value of RXBw, or through other adjustments. In some embodiments, a step size adjustment is applied to the parameter of $RX_{BW}$. In block 1328, if after the adjustment of $RX_{BW}$ the triple beat no longer overlaps with the FDD bands, then triple beat has been successfully mitigated and the process 1300 ends (block 1308). If after the adjustment of RX B w the triple beat still overlaps with the FDD bands, then $RX_{BW}$ is re-adjusted to a new (untested) value and the process of blocks 1326 and 1328 repeats, until either a $RX_{BW}$ value is found for which the triple beat no longer overlaps with the FDD bands (and the process ends at block 1308) or there are no more $RX_{BW}$ values to test.

If there are no more $RX_{BW}$ values to test, then process 1300 ends at block 1330 with a determination that triple beat interference is unavoidable in the current configuration. It will be appreciated that, in some embodiments, the parameters may be tested in different orders, and/or different combinations of values may be tested than described with reference to process 1300. For example, in the illustrated algorithm one parameter is adjusted at a time and triple beat detection is run with the adjusted value. In other embodiments, more than one parameter may be adjusted at a time.

Figure 14:
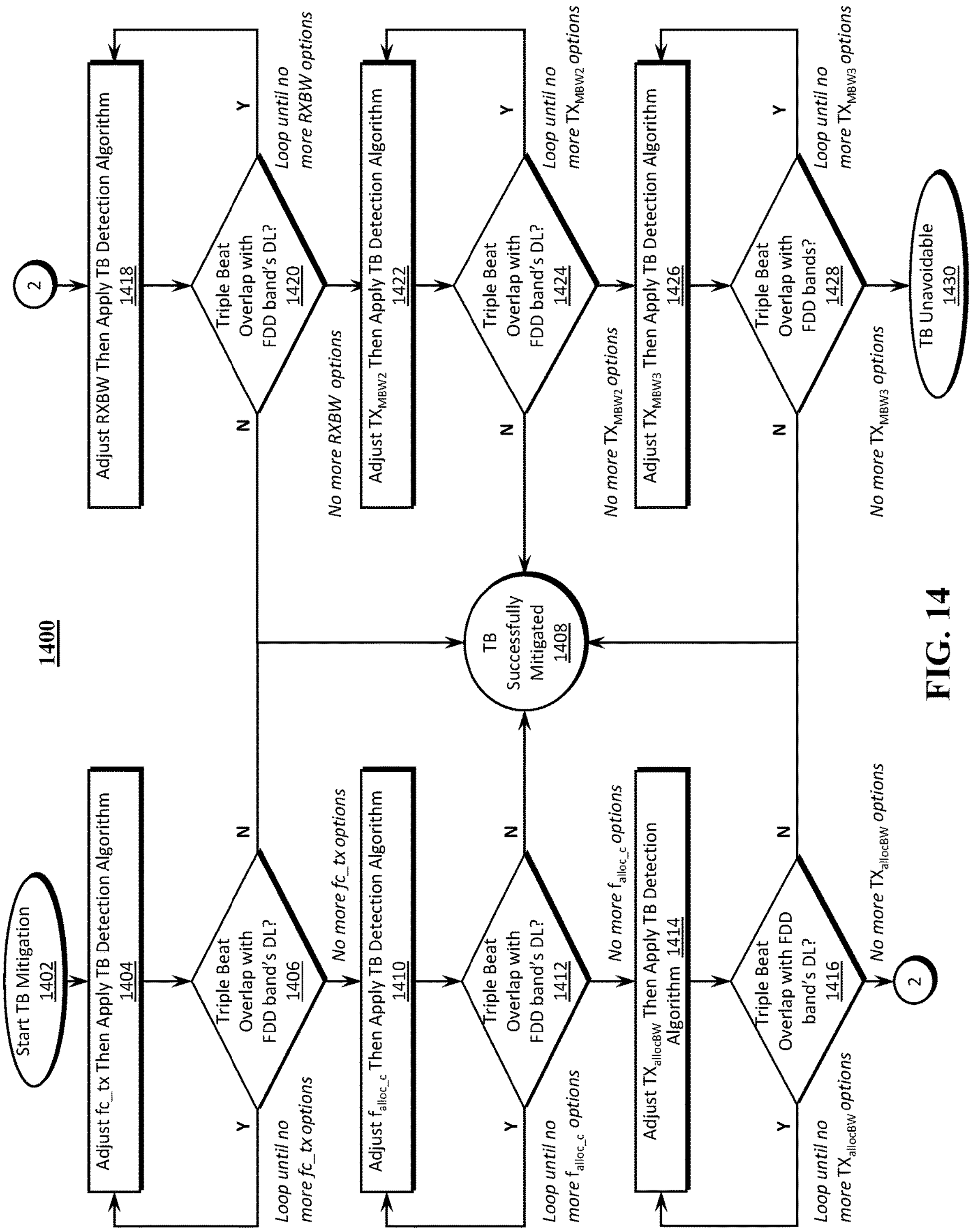
FIG. 14 is a flow chart illustrating an example triple beat mitigation process for use in a non-contiguous carrier aggregation scenario, in accordance with one or more embodiments of the present disclosure.

FIG. 14 illustrates an example process 1400 for mitigating and/or avoiding triple beat interference in a non-contiguous ULCA, in accordance with one or more embodiments of the present disclosure. The process 1400 may be initiated (block 1402), for example, from block 1210 in FIG. 12 when triple beat interference is detected.

In block 1404, the parameter fc_tx is adjusted and the triple beat detection algorithm (e.g., the process 1200 of FIG. 12) is run with the new parameters. In various embodiments, the parameter fc_tx may be adjusted by increasing the value of fc_tx, decreasing the value of fc_tx, or through other adjustments. In some embodiments, a step size adjustment is applied to the parameter fc_tx. In block 1406, if after the adjustment of fc_tx the triple beat no longer overlaps with the FDD bands, then triple beat has been successfully mitigated and the process 1400 ends (block 1408). If after the adjustment of fc_tx the triple beat still overlaps with the FDD bands, then fc_tx is re-adjusted to a new (untested) value and the process of blocks 1404 and 1406 repeats, until either a fc_tx value is found for which the triple beat no longer overlaps with the FDD bands (and the process ends at block 1408) or there are no more fc_tx values to test.

If there are no more fc_tx values to test, then process 1400 proceeds to block 1410. In block 1410, the parameter $f_{alloc\_c}$ is adjusted and the triple beat detection algorithm (e.g., the process 1200 of FIG. 12) is run with the initial parameter values and the adjusted $f_{alloc\_c}$ value. In various embodiments, the parameter $f_{alloc\_c}$ may be adjusted by increasing the value of $f_{alloc\_c}$, decreasing the value of $f_{alloc\_c}$, or through other adjustments. In some embodiments, a step size adjustment is applied to the parameter of $f_{alloc\_c}$. In block 1412, if after the adjustment of $f_{alloc\_c}$ the triple beat no longer overlaps with the FDD bands, then triple beat has been successfully mitigated and the process 1400 ends (block 1408). If after the adjustment of $f_{alloc\_c}$ the triple beat still overlaps with the FDD bands, then $f_{alloc\_c}$ is re-adjusted to a new (untested) value and the process of blocks 1410 and 1412 repeats, until either a $f_{alloc\_c}$ value is found for which the triple beat no longer overlaps with the FDD bands (and the process ends at block 1408) or there are no more falloc c values to test.

If there are no more $f_{alloc\_c}$ values to test, then process 1400 proceeds to block 1414. In block 1414, the parameter $TX_{allocBW}$ is adjusted and the triple beat detection algorithm (e.g., the process 1200 of FIG. 12) is run with the initial parameter values and the adjusted $TX_{allocBW}$ value. In various embodiments, the parameter $TX_{allocBW}$ may be adjusted by increasing the value of $TX_{allocBW}$, decreasing the value of $TX_{allocBW}$, or through other adjustments. In some embodiments, a step size adjustment is applied to the parameter of $TX_{MBW2}$. In block 1416, if after the adjustment of $TX_{allocBW}$ the triple beat no longer overlaps with the FDD bands, then triple beat has been successfully mitigated and the process 1400 ends (block 1408). If after the adjustment of $TX_{allocBW}$ the triple beat still overlaps with the FDD bands, then $TX_{allocBW}$ is re-adjusted to a new (untested) value and the process of blocks 1414 and 1416 repeats, until either a $TX_{allocBW}$ value is found for which the triple beat no longer overlaps with the FDD bands (and the process ends at block 1408) or there are no more $TX_{allocBW}$ values to test.

If there are no more $TX_{allocBW}$ values to test, then process 1400 proceeds to block 1418. In block 418, the parameter RX B w is adjusted and the triple beat detection algorithm (e.g., the process 1200 of FIG. 12) is run with the initial parameter values, and the adjusted $RX_{BW}$ parameter. In various embodiments, the parameter $RX_{BW}$ may be adjusted by increasing the value of $RX_{BW}$, decreasing the value of $RX_{BW}$, or through other adjustments. In some embodiments, a step size adjustment is applied to the parameter of $RX_{BW}$. In block 1420, if after the adjustment of $RX_{BW}$ the triple beat no longer overlaps with the FDD bands, then triple beat has been successfully mitigated and the process 1400 ends (block 1408). If after the adjustment of $RX_{BW}$ the triple beat still overlaps with the FDD bands, then RX B w is re-adjusted to a new (untested) value and the process of blocks 1418 and 1420 repeats, until either a $RX_{BW}$ value is found for which the triple beat no longer overlaps with the FDD bands (and the process ends at block 1408) or there are no more $RX_{BW}$ values to test.

If there are no more $RX_{BW}$ values to test, then process 1400 proceeds to block 1422. In block 1422, the parameter $TX_{MBW2}$ is adjusted and the triple beat detection algorithm (e.g., the process 1200 of FIG. 12) is run with the initial parameter values, and the adjusted $TX_{MBW2}$ parameter. In various embodiments, the parameter $TX_{MBW2}$ may be adjusted by increasing the value of $TX_{MBW2}$, decreasing the value of $TX_{MBW2}$, or through other adjustments. In some embodiments, a step size adjustment is applied to the parameter of $TX_{MBW2}$. In block 1424, if after the adjustment of $TX_{MBW2}$ the triple beat no longer overlaps with the FDD bands, then triple beat has been successfully mitigated and the process 1400 ends (block 1408). If after the adjustment of $TX_{MBW2}$ the triple beat still overlaps with the FDD bands, then $TX_{MBW2}$ is re-adjusted to a new (untested) value and the process of blocks 1422 and 1424 repeats, until either a $TX_{MBW2}$ value is found for which the triple beat no longer overlaps with the FDD bands (and the process ends at block 1408) or there are no more $TX_{MBW2}$ values to test.

If there are no more $TX_{MBW2}$ values to test, then process 1400 proceeds to block 1422. In block 1426, the parameter $TX_{MBW3}$ is adjusted and the triple beat detection algorithm (e.g., the process 1200 of FIG. 12) is run with the initial parameter values, and the adjusted $TX_{MBW3}$ parameter. In various embodiments, the parameter $TX_{MBW3}$ may be adjusted by increasing the value of $TX_{MBW3}$, decreasing the value of $TX_{MBW3}$, or through other adjustments. In some embodiments, a step size adjustment is applied to the parameter of $TX_{MBW3}$. In block 1428, if after the adjustment of $TX_{MBW2}$ the triple beat no longer overlaps with the FDD bands, then triple beat has been successfully mitigated and the process 1400 ends (block 1408). If after the adjustment of $TX_{MBW3}$ the triple beat still overlaps with the FDD bands, then $TX_{MBW3}$ is re-adjusted to a new (untested) value and the process of blocks 1426 and 1428 repeats, until either a $TX_{MBW3}$ value is found for which the triple beat no longer overlaps with the FDD bands (and the process ends at block 1408) or there are no more $TX_{MBW3}$ values to test.

If there are no more $TX_{MBW2}$ values to test, then process 1400 ends at block 1430 with a determination that triple beat interference is unavoidable in the current configuration. It will be appreciated that, in some embodiments, the parameters may be tested in different orders, and/or different combinations of values may be tested than described with reference to process 1400. For example, in the illustrated algorithm one parameter is adjusted at a time and triple beat detection is run with the adjusted value. In other embodiments, more than one parameter may be adjusted at a time.

In some embodiments, the triple beat detection systems and methods disclosed herein may be implemented in inter-band carrier aggregation scenarios. In some embodiments, the triple beat detection equations may be simplified for various implementations. For example, in some embodiments, the intra-band carrier aggregation includes contiguous uplink band carrier aggregation, and detecting triple beat interference includes evaluating whether the equation $|\text{Duplex Offset}| < ULCA_{MBW} - TX_{MBW}2\ RX_{BW}/2$ is true, where Duplex Offset represents a distance between an allocated transmit channel and an allocated receive channel, $ULCA_{MBW}$ represents a bandwidth of the contiguous uplink bands, $TX_{MBW}$ represents a bandwidth of the allocated transmit channel, and $RX_{RW}$ is a bandwidth of the allocated receive channel.

In some embodiments, the intra-band carrier aggregation includes non-contiguous uplink band carrier aggregation, and detecting triple beat interference includes evaluating whether equation $$W_{gap} - \frac{TX_{MBW}}{2} - \frac{RX_{BW}}{2} < |\text{Duplex Offset}| < W_{gap} + \frac{TX_{MBW}}{2} + \frac{RX_{BW}}{2} + TX_{MBW2} + TX_{MBW3}$$

evaluates to true, where the Duplex Offset represents a distance between an allocated transmit channel and an allocated receive channel, $TX_{MBW}$ represents a bandwidth of the allocated transmit channel, $RX_{BW}$ is a bandwidth of the allocated receive channel, $TX_{MBW2}$ represents a bandwidth of a second transmission band, $TX_{MBW3}$ represents a bandwidth of a third transmission band, and $W_{gap}$ represents a distance between $TX_{MBW2}$ and $TX_{MBW3}$.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the invention is defined only by the following claims.

What is claimed is:

1. A method comprising:

implementing a carrier aggregation communications protocol across a plurality of frequency bands;

identifying a carrier aggregation channel allocation for a client device;

detecting triple beat interference in the plurality of frequency bands by the carrier aggregation channel allocation; and mitigating the detected triple beat interference through reallocation of the carrier aggregation channels to the client device by:

adjusting one or more allocation parameters to derive an updated carrier aggregation channel allocation;

detecting whether the triple beat interference is present in the plurality of frequency bands by the updated carrier aggregation channel allocation; and repeating the adjusting if the triple beat interference is detected.

2. The method of claim 1, wherein the carrier aggregation is an intra-band carrier aggregation, and wherein detecting triple beat interference comprises:

determining whether an intra-band carrier aggregation channel allocation is susceptible to triple beat interference;

calculating a triple beat condition for the intra-band carrier aggregation channel allocation;

determining whether the triple beat condition overlaps a victim band in the plurality of frequency bands; and implementing mitigation of the triple beat interference if the triple beat condition is detected to overlap the victim band.

3. The method of claim 2, wherein the intra-band carrier aggregation channel allocation comprises a downlink configuration and an uplink configuration; and wherein determining whether the intra-band carrier aggregation channel allocation is susceptible to triple beat interference comprises:

assessing whether the uplink configuration comprises an uplink inter-band combination with three uplink component carriers within two uplink clusters.

4. The method of claim 1, wherein the carrier aggregation is intra-band carrier aggregation comprising contiguous uplink band carrier aggregation; and wherein detecting triple beat interference comprises evaluating whether the equation $$(f_{alloc\_c}-fc\_tx)-TX_{allocBW}/2+ULCA_{MBW}-RX_{BW}/2-BW2-BW3<\text{Duplex Offset}<(f_{alloc\_c}-fc\_tx)+TX_{allocBW}/2+ULCA_{MBW}+RX_{BW}/2$$

is true for victim bands having a positive duplex offset where a downlink frequency is less than an upload frequency, wherein the Duplex Offset represents a distance between an allocated transmit channel and an allocated receive channel, $ULCA_{MBW}$ represents a bandwidth of contiguous uplink bands, $RX_{BW}$ is a bandwidth of an allocated receive channel, fc_tx represents a center frequency of a victim transmit band, $TX_{allocBW}$ represents an allocated bandwidth of a transmit frequency, BW2 and BW3 represent an allocated bandwidth of two carrier frequencies, and falloc_c is a center frequency of an allocated transmit channel; and wherein detecting triple beat interference comprises evaluating whether equation $$-(f_{alloc\_c}-fc\_tx)-TX_{allocBW}/2+ULCA_{MBW}-RX_{BW}/2-BW2-BW3<-\text{Duplex Offset}<-(f_{alloc\_c}-fc\_tx)+TX_{allocBW}/2+ULCA_{MBW}+RX_{BW}/2$$

is true for victim bands having a negative duplex offset where the downlink frequency is less than the upload frequency.

5. The method of claim 1, wherein the carrier aggregation is intra-band carrier aggregation comprising non-contiguous uplink band carrier aggregation; and wherein detecting triple beat interference comprises evaluating whether equation $$Wgap+f_{alloc\_c}-fc\_tx-TX_{allocBW}/2-RX_{BW}/2<\text{Duplex Offset}<Wgap+f_{alloc\_c}-fc\_tx+TX_{allocBW}/2+RX_{BW}/2+TX_{MBW2}+TX_{MBW3}$$

is true for victim bands having a positive duplex offset where a downlink frequency is greater than an upload frequency, wherein Wgap represents a distance between $TX_{MBW2}$ and $TX_{MBW3}$, the Duplex Offset represents a distance between an allocated transmit channel and an allocated receive channel, $RX_{BW}$ represents a bandwidth of an allocated receive channel, $TX_{MBW2}$ represents a bandwidth of a second transmission band, $TX_{MBW3}$ represents a bandwidth of a third transmission band, $TX_{allocBW}$ represents an allocated bandwidth of the transmit frequency, $f_{alloc\_c}$ represents a center frequency of an allocated transmit channel, and fc_tx represents a center frequency of a victim transmit band; and wherein detecting triple beat interference comprises evaluating whether equation $$Wgap-f_{alloc\_c}+fc\_tx-TX_{allocBW}/2-RX_{BW}/2<-\text{Duplex\_Offset}<Wgap-f_{alloc\_c}+fc\_tx+TX_{allocBW}/2+RX_{BW}/2+TX_{MBW2}+TX_{MBW3}$$

is true for victim bands having a negative duplex offset where the downlink frequency is greater than the upload frequency.

6. The method of claim 1, wherein the carrier aggregation comprises contiguous uplink band carrier aggregation; and wherein adjusting one or more allocation parameters comprises adjusting one or more of the bandwidth of the contiguous uplink bands, a bandwidth of the allocated transmit channel, and/or a bandwidth of the allocated receive channel.

7. The method of claim 1, wherein the carrier aggregation comprises non-contiguous uplink band carrier aggregation; and wherein adjusting one or more allocation parameters comprises adjusting one or more of a bandwidth of the allocated transmit channel, a bandwidth of the allocated receive channel, and/or a bandwidth of one or more transmission bands.

8. The method of claim 1, wherein adjusting one or more allocation parameters comprises incrementally increasing and/or decreasing an allocation parameter value; and wherein repeating the adjusting if the triple beat interference is detected is performed until the allocation parameter value is outside of an available range.

9. A system comprising:

communications components configured to implement a carrier aggregation communications protocol across a plurality of frequency bands;

a logic device configured to:

identify a carrier aggregation channel allocation for a client device;

detect triple beat interference in the plurality of frequency bands by the carrier aggregation channel allocation, wherein the carrier aggregation is intra-band carrier aggregation, and wherein detecting the triple beat interference comprises:

determine whether the intra-band carrier aggregation channel allocation is susceptible to triple beat interference by assessing whether an uplink configuration comprises an uplink inter-band combination with three uplink component carriers within two uplink clusters;

calculate a triple beat condition for the intra-band carrier aggregation channel allocation;

determine whether the triple beat condition overlaps a victim band in the plurality of frequency bands; and implement mitigation of the triple beat interference if the triple beat condition is detected to overlap the victim band; and mitigate the detected triple beat interference through reallocation of the carrier aggregation channels to the client device.

10. The system of claim 9, wherein the logic device is further configured to mitigate the detected triple beat interference through the reallocation of the carrier aggregation channels to the client device by:

adjusting one or more allocation parameters to derive an updated carrier aggregation channel allocation;

detecting whether triple beat interference is present in the plurality of frequency bands by the updated carrier aggregation channel allocation; and repeating the adjusting if the triple beat interference is detected.

11. The system of claim 10, wherein the carrier aggregation comprises contiguous uplink band carrier aggregation; and wherein the logic device is further configured to adjust one or more allocation parameters by adjusting one or more of a bandwidth of the contiguous uplink bands, a bandwidth of the allocated transmit channel, and/or a bandwidth of the allocated receive channel.

12. A system comprising:

communications components configured to implement a carrier aggregation communications protocol across a plurality of frequency bands;

a logic device configured to:

identify a carrier aggregation channel allocation for a client device;

detect triple beat interference in the plurality of frequency bands by the carrier aggregation channel allocation; and mitigate the detected triple beat interference through reallocation of the carrier aggregation channels to the client device by:

adjusting one or more allocation parameters to derive an updated carrier aggregation channel allocation;

detecting whether triple beat interference is present in the plurality of frequency bands by the updated carrier aggregation channel allocation; and repeating the adjusting if the triple beat interference is detected.

13. The system of claim 12, wherein the carrier aggregation is an intra-band carrier aggregation; and wherein the logic device is further configured to detect triple beat interference by:

determining whether an intra-band carrier aggregation channel allocation is susceptible to triple beat interference;

calculating a triple beat condition for the intra-band carrier aggregation channel allocation;

determining whether the triple beat condition overlaps a victim band in the plurality of frequency bands; and implementing mitigation of the triple beat interference if the triple beat condition is detected to overlap the victim band.

14. The system of claim 13, wherein the intra-band carrier aggregation channel allocation comprises a downlink configuration and an uplink configuration; and wherein the logic device is further configured to determine whether the intra-band carrier aggregation channel allocation is susceptible to triple beat interference by:

assessing whether the uplink configuration comprises an uplink inter-band combination with three uplink component carriers within two uplink clusters.

15. The system of claim 12, wherein the carrier aggregation is an intra-band carrier aggregation comprising contiguous uplink band carrier aggregation; and wherein detecting triple beat interference comprises evaluating whether the equation $$(f_{alloc\_c}-\text{fc\_tx})-TX_{allocBW}/2+ULCA_{MBW}-RX_{BW}/2-BW2-BW3<\text{Duplex Offset}<(f_{alloc\_c}-\text{fc\_tx})+TX_{allocBW}/2+ULCA_{MBW}+RX_{BW}/2$$

is true for victim bands having a positive duplex offset where a downlink frequency is less than an upload frequency, wherein the Duplex Offset represents a distance between an allocated transmit channel and an allocated receive channel, $ULCA_{MBW}$ represents a bandwidth of contiguous uplink bands, $RX_{BW}$ is a bandwidth of an allocated receive channel, fc_tx represents a center frequency of a victim transmit band, $TX_{allocBW}$ represents an allocated bandwidth of a transmit frequency, BW2 and BW3 represent an allocated bandwidth of two carrier frequencies, and falloc_c is a center frequency of an allocated transmit channel; and wherein detecting triple beat interference comprises evaluating whether equation $$-(f_{alloc\_c}-\text{fc\_tx})-TX_{allocBW}/2+ULCA_{MBW}-RX_{BW}/2-BW2-BW3<-\text{Duplex Offset}<-(f_{alloc\_c}-\text{fc\_tx})+TX_{allocBW}/2+ULCA_{MBW}+RX_{BW}/2$$

is true for victim bands having a negative duplex offset where the downlink frequency is less than the upload frequency.

16. The system of claim 12, wherein the carrier aggregation is an intra-band carrier aggregation comprising non-contiguous uplink band carrier aggregation; and wherein the logic device is further configured to detect triple beat interference comprises evaluating whether equation $$\text{Wgap}+f_{alloc\_c}-\text{fc\_tx}-TX_{allocBW}/2-RX_{BW}/2<\text{Duplex Offset}<\text{Wgap}+f_{alloc\_c}-\text{fc\_tx}+TX_{allocBW}/2+RX_{BW}/2+TX_{MBW2}+TX_{MBW3}$$

is true for victim bands having a positive duplex offset where a downlink frequency is greater than an upload frequency, wherein Wgap represents a distance between $TX_{MBW2}$ and $TX_{MBW3}$, the Duplex Offset represents a distance between an allocated transmit channel and an allocated receive channel, $RX_{BW}$ represents a bandwidth of an allocated receive channel, $TX_{MBW2}$ represents a bandwidth of a second transmission band, $TX_{MBW3}$ represents a bandwidth of a third transmission band, $TX_{allocBW}$ represents an allocated bandwidth of the transmit frequency, $f_{alloc\_c}$ represents a center frequency of an allocated transmit channel, and fc_tx represents a center frequency of a victim transmit band; and wherein detecting triple beat interference comprises evaluating whether equation $$\text{Wgap}-f_{alloc\_c}+\text{fc\_tx}-TX_{allocBW}/2-RX_{BW}/2<-\text{Duplex\_Offset}<\text{Wgap}-f_{alloc\_c}+\text{fc\_tx}+TX_{allocBW}/2+RX_{BW}/2+TX_{MBW2}+TX_{MBW3}$$

is true for victim bands having a negative duplex offset where the downlink frequency is greater than the upload frequency.

17. The system of claim 12, wherein the carrier aggregation comprises contiguous uplink band carrier aggregation; and wherein the logic device is further configured to adjust one or more allocation parameters by adjusting one or more of the bandwidth of the contiguous uplink bands, a bandwidth of the allocated transmit channel, and/or a bandwidth of the allocated receive channel.

18. The system of claim 12, wherein the carrier aggregation comprises non-contiguous uplink band carrier aggregation; and wherein the logic device is further configured to adjust one or more allocation parameters by adjusting one or more of a bandwidth of the allocated transmit channel, a bandwidth of the allocated receive channel, and/or a bandwidth of one or more transmission bands.

19. The system of claim 12, wherein the logic device is further configured to adjust one or more allocation parameters by incrementally increasing and/or decreasing an allocation parameter value; and wherein the logic device is further configured to repeat the adjusting if the triple beat interference is detected until the allocation parameter value is outside of an available range.

20. The system of claim 12, wherein the system comprises user equipment and/or a base station.

* * * * *